United States Patent
Onishi et al.

(10) Patent No.: US 8,224,619 B2
(45) Date of Patent: Jul. 17, 2012

(54) GESTURE RECOGNITION APPARATUS, GESTURE RECOGNITION METHOD AND PROGRAM

(75) Inventors: Yusuke Onishi, Tokyo (JP); Ichiro Munakata, Kanagawa (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 12/697,757

(22) Filed: Feb. 1, 2010

(65) Prior Publication Data

US 2010/0204953 A1 Aug. 12, 2010

(30) Foreign Application Priority Data

Feb. 12, 2009 (JP) ................................ 2009-030136
May 18, 2009 (JP) ................................ 2009-120193

(51) Int. Cl.
*G06F 15/00* (2006.01)
(52) U.S. Cl. ...................................................... 702/150
(58) Field of Classification Search .................. 702/150
See application file for complete search history.

(56) References Cited

U.S. PATENT DOCUMENTS

2004/0081340 A1* 4/2004 Hashimoto .................. 382/128

FOREIGN PATENT DOCUMENTS

| JP | 05-081503 | 4/1993 |
|----|-----------|--------|
| JP | 07-038971 | 2/1995 |
| JP | 11-259206 | 9/1999 |
| JP | 2006-277626 | 10/2006 |
| JP | 2008-016015 | 1/2008 |

* cited by examiner

*Primary Examiner* — Tung S Lau
(74) *Attorney, Agent, or Firm* — Wolf, Greenfield & Sacks, P.C.

(57) ABSTRACT

A gesture recognition apparatus includes: first and second one-dimensional sensor means for detecting movement corresponding to a motion of an object in a one-dimensional direction along one detection axis and outputting a signal corresponding to the detected movement; a normalization processing means for executing processing of normalization of first and second signals outputted from the first and second one-dimensional sensor means; a phase plane mapping processing means for forming a signal track corresponding to the first and second signals in time series by plotting coordinates on a phase plane using x- and y-coordinate values based on the normalized first and second signals; a correlation coefficient calculation means for calculating a correlation coefficient with respect to the first and second signals using coordinate values forming the signal track; and a motion determination means for determining whether the detected movement is a motion in the first or second direction based on the value of the correlation coefficient.

10 Claims, 21 Drawing Sheets

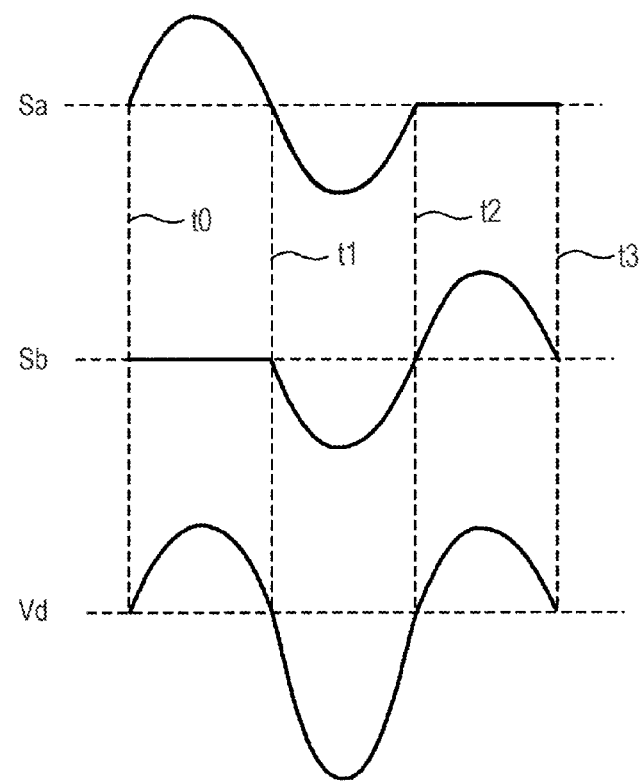
FIG.5A MOTION DIRECTION 1
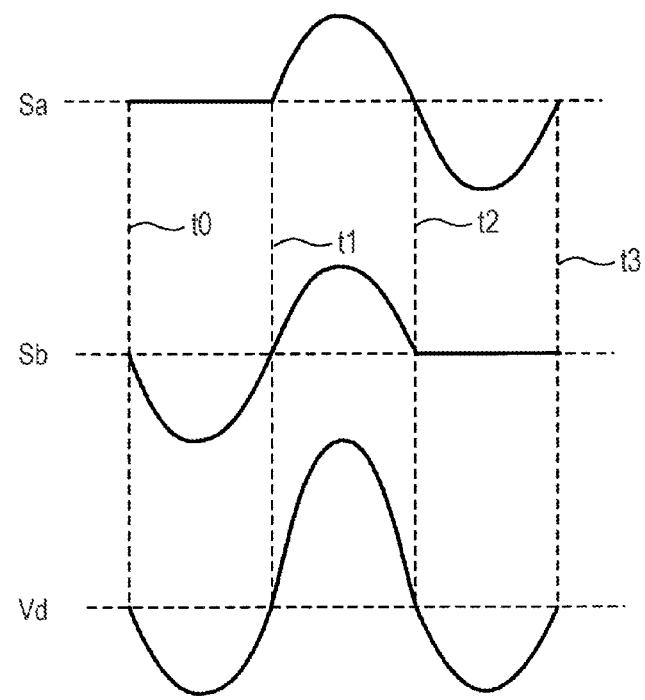
FIG.5B MOTION DIRECTION 2

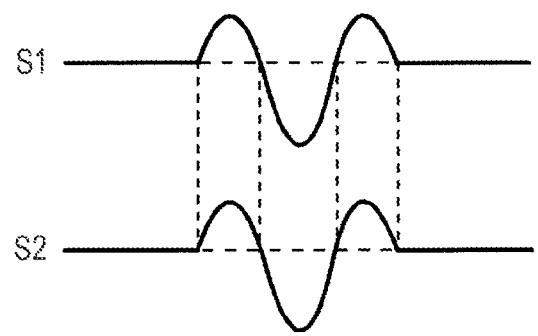
FIG.10A LEFTWARD MOTION
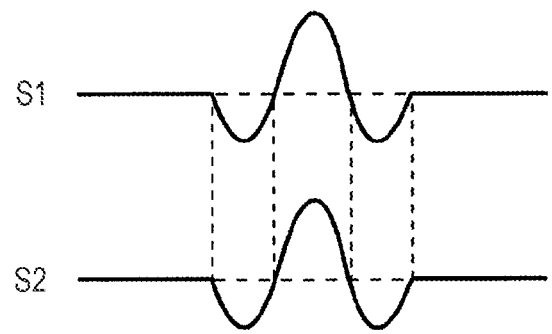
FIG.10B RIGHTWARD MOTION
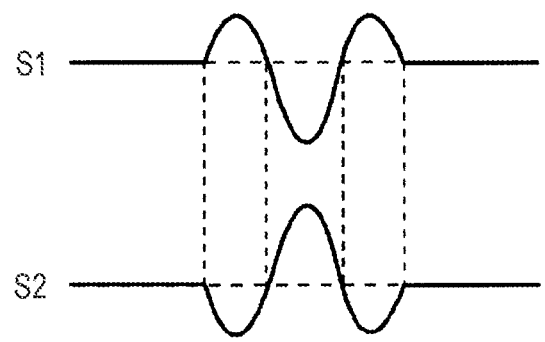
FIG.10C UPWARD MOTION
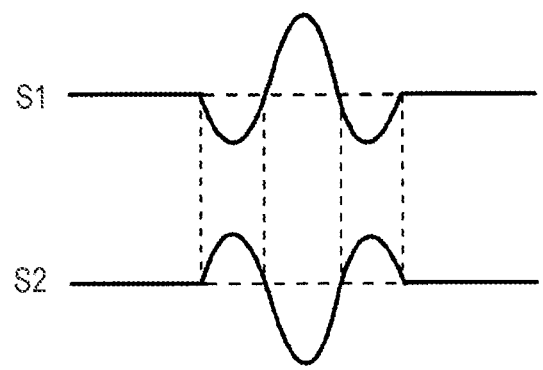
FIG.10D DOWNWARD MOTION

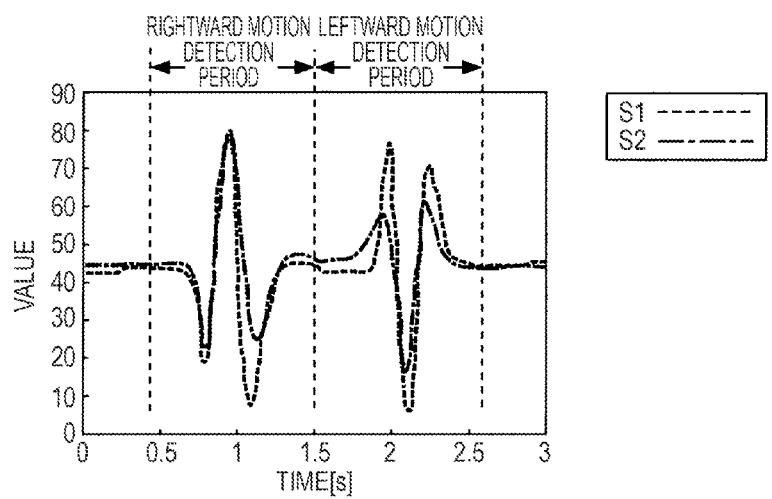
FIG.12A
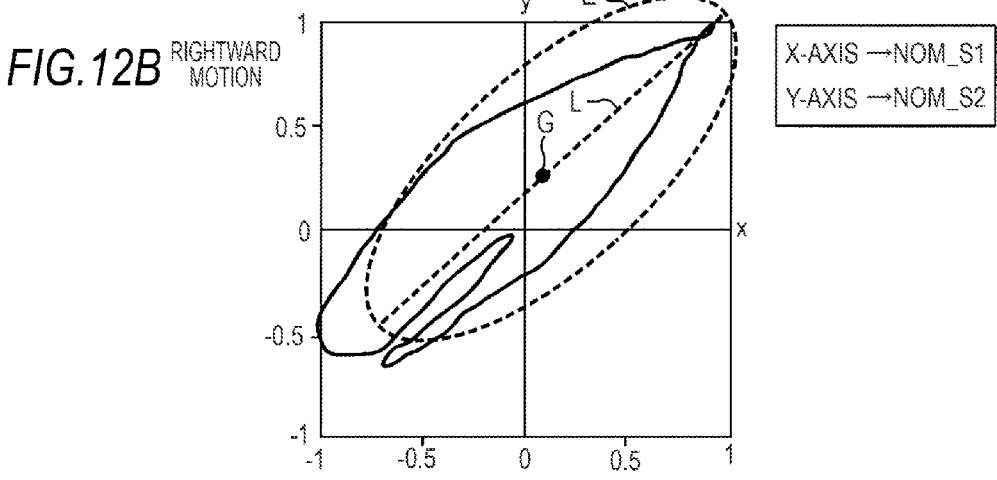
FIG.12B RIGHTWARD MOTION
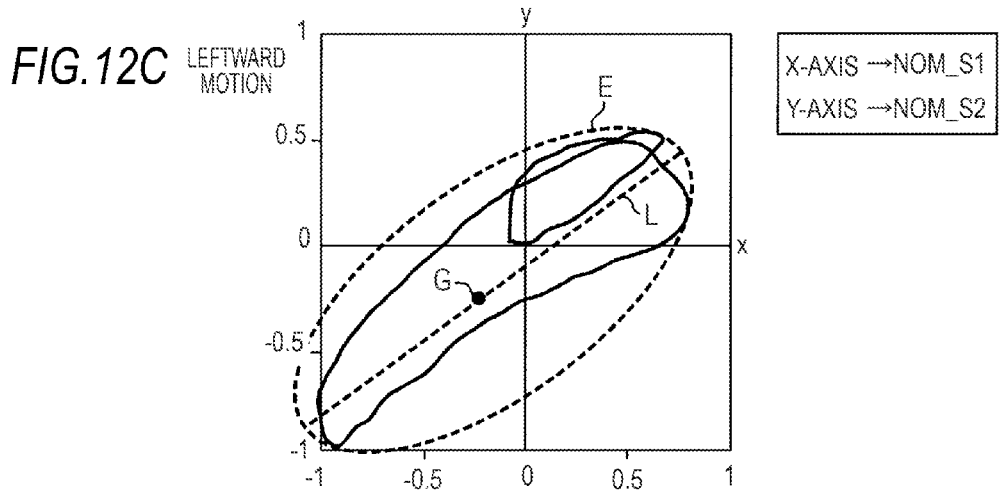
FIG.12C LEFTWARD MOTION FIG.13A
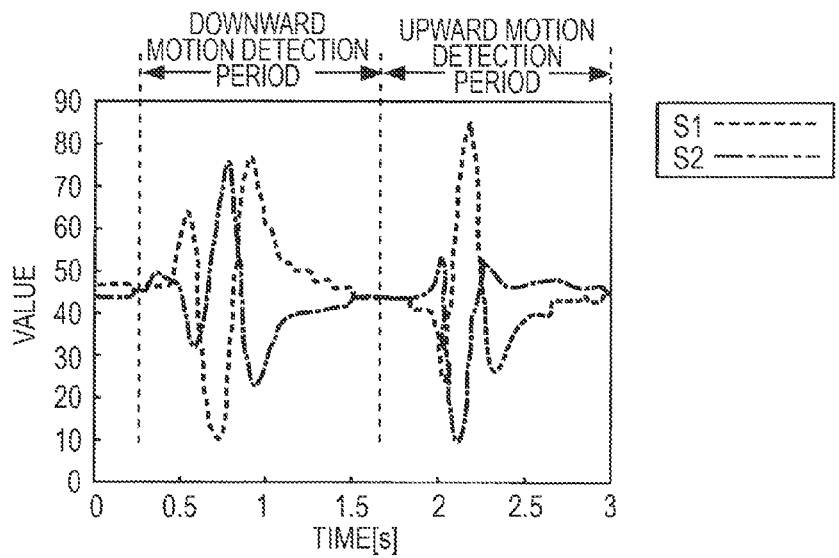
FIG.13B DOWNWARD MOTION
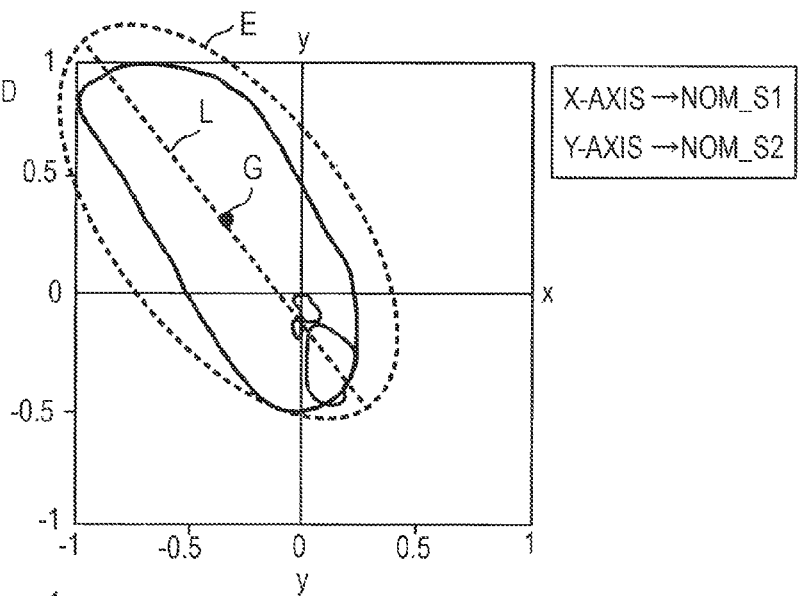
FIG.13C UPWARD MOTION
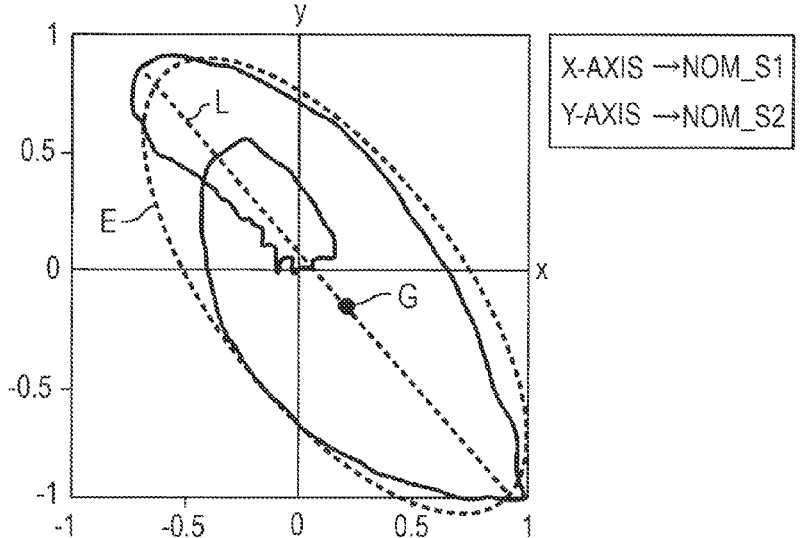

RIGHT-TURNING MOTION

GESTURE RECOGNITION APPARATUS, GESTURE RECOGNITION METHOD AND PROGRAM

CROSS REFERENCE TO RELATED APPLICATIONS

The present application claims priority under 35 U.S.C. § 119 to Japanese Priority Patent Applications JP 2009-030136 and JP 2009-120193 filed in the Japan Patent Office on Feb. 12, 2009 and May 18, 2009, respectively, the entire contents of which are hereby incorporated by reference.

BACKGROUND OF THE INVENTION

1. Field of the Invention

The present invention relates to a gesture recognition apparatus for recognizing motions (gestures) such as movement of a human's hand, a method thereof and a program executed by the gesture recognition apparatus.

2. Description of the Related Art

As gesture recognition techniques/methods for recognizing motions (gestures) performed by human beings, the followings are known.

As one of the techniques, a technique of performing gesture recognition is known, in which image signal processing for motion analysis is performed with respect to an image signal obtained by imaging a subject which is making a gesture by an imaging apparatus.

Another technique is also known, in which a remote control apparatus on which an acceleration sensor is mounted is provided and gesture recognition is performed based on a detection signal from the acceleration sensor obtained according to a motion, for example, performed by a user holding the remote control apparatus.

Additionally, another technique of detecting human movement by using, for example, an infrared detecting element for detecting infrared radiation emitted from a human body is also known.

The results of the above gesture recognition can be applied to, for example, operation commands for electronic apparatuses. That is to say, it is possible to remotely operate electronic apparatuses by the user moving as specific gestures.

For example, in the method of using the infrared detecting element in the above gesture recognition methods, an imaging apparatus is not necessary and execution of image signal processing having large processing load is not necessary either as compared with the method in which image signal processing for motion analysis is performed with respect to the taken image signal. In addition, when making a gesture, body parts such as a user's hand may be used, therefore, it is not necessary to provide with the remote control apparatus on which the acceleration sensor is mounted.

For example, in JP-A-5-81503 (Patent Document 1), there is disclosed a configuration in which, when a signal having the same polarity as a signal which determined a movement direction is detected within a given period of time from the input of the signal, the detected signal is determined to be the same direction as the movement direction so that movements in the same direction can be successively inputted by a dual element-type pyroelectric sensor which is a type of the infrared detecting elements.

In JP-A-2008-16015 (Patent Document 2), there is disclosed a configuration of an intrusion detection system for discriminating a human body and small animals by using the pyroelectric sensor.

In JP-A-7-38971 (Patent Document 3), there is disclosed a configuration in which four infrared detecting elements are arranged in a cross shape of up and down, left and right in a television receiver, and channels are changed in accordance with gestures by movement of a user's hand along right and left directions as well as volume is adjusted in accordance with gestures by movement of the user's hand along up and down directions based on the time difference between detection signals obtained by these infrared detecting elements.

In JP-A-11-259206 (Patent Document 4), there is disclosed a configuration in which only quick movement of a specific part of a human body in a specific direction can be recognized by using a filter unit which allows signals having frequencies higher than a given frequency to transmit in detection signals by an infrared detecting element.

In JP-A-2006-27726 (Patent Document 5), there is disclosed a configuration in which two pyroelectric infrared sensors each having two body detection areas are used to determine a movement direction of a human body in a uniaxial direction.

SUMMARY OF THE INVENTION

It is desirable to obtain gesture recognition results having reliability higher than the past by using a one-dimensional sensor which can detect movement of uniaxial direction (one dimension), which is typified by, for example, a dual-type pyroelectric sensor.

According to an embodiment of the invention, there is provided a gesture recognition apparatus described as follows.

That is, the gesture recognition apparatus includes first and second one-dimensional sensor means for detecting movement corresponding to a motion of an object in a one-dimensional direction along one detection axis and outputting a signal corresponding to the detected movement, in which detection axes are arranged along different directions with respect to a first direction and a second direction which are directions of linear motions of the object defined as a recognition target, a normalization processing means for executing processing of normalization by converting amplitude values of respective first and second signals outputted from the first and second one-dimensional sensor means into values represented by the ratio with respect to peak values, a phase plane mapping processing means for forming a signal track corresponding to the first and second signals in time series by plotting coordinates on a phase plane by using x-coordinate values based on values of the normalized first signals and y-coordinate values based on values of the normalized second signals at respective same timings, a correlation coefficient calculation means for calculating a correlation coefficient with respect to the first and second signals by using coordinate values forming the signal track, and a motion determination means for determining whether the detected movement is a motion in the first direction or a motion in the second direction at least based on whether the value of the correlation coefficient is positive or negative.

In the above configuration, the first and second one-dimensional sensor means are configured so that the detection axes are arranged along different directions with respect to the first direction and the second direction which are directions of linear motions of the object which have been previously defined. According to this, both the first and second one-dimensional sensor means can detect the motion in good condition and output signals even when any of motions in the first direction and second direction is performed.

On that condition, signals from the first and second one-dimensional sensor means are normalized and mapped on the phase plane to form the signal track, and further, the correlation coefficient of the signal track is calculated.

The phase and polarity of signals outputted from the first and second one-dimensional sensor means are reflected on the shape of the signal track. Accordingly, positive/negative of the correlation coefficient calculated from the signal track corresponds to whether the detected motion is the first-direction motion or the second-direction motion. Therefore, it is possible to make a determination so as to discriminate the first-direction motion from the second-direction motion based on the correlation coefficient.

As described above, according to the embodiment of the invention, it is possible to make a determination concerning motions at least in directions along two axes which are the first direction and the second direction different from each other with higher precision as compared with the past.

BRIEF DESCRIPTION OF THE DRAWINGS

FIG. 5A and FIG. 5B are waveform diagrams for explaining the principle of motion detection by the dual-type pyroelectric sensor;

FIG. 10A to FIG. 10D are waveform diagrams showing sensor signals corresponding to a leftward motion, a rightward motion, an upward motion and a downward which are obtained under the arrangement example of one-dimensional sensors according to the embodiment;

FIG. 12A to FIG. 12C are graphs showing examples of sensor signals and signal tracks on the phase plane obtained corresponding to the rightward motion and the leftward motion;

FIG. 13A to FIG. 13C are graphs showing examples of sensor signals and signal tracks on the phase plane obtained corresponding to the downward motion and the upward motion;

DESCRIPTION OF THE PREFERRED EMBODIMENTS

Figure 1:
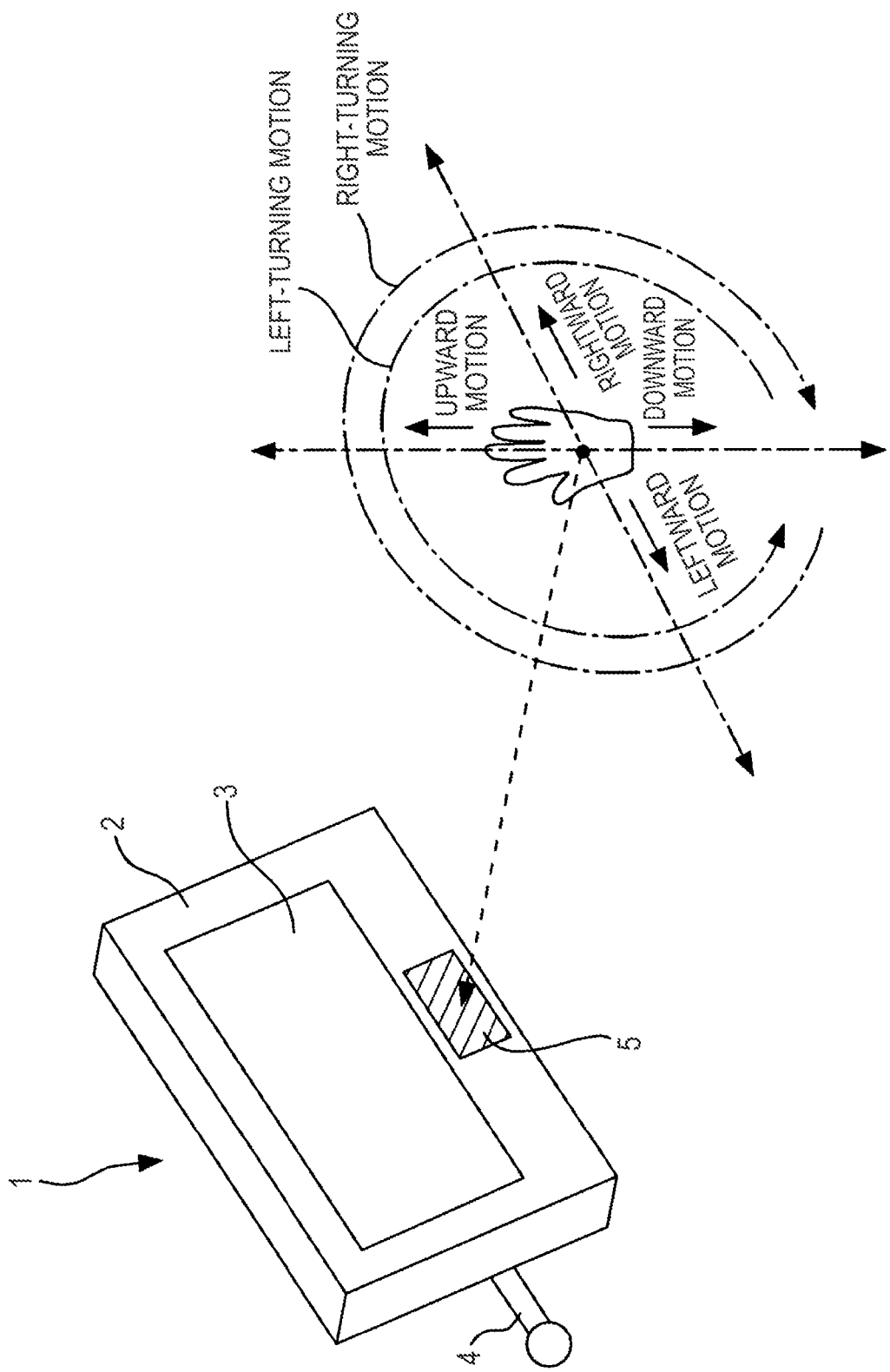
FIG. 1 is a view showing an appearance example of a photo frame display device and an example of gesture motions defined as gesture operations with respect to the photo frame display device according to an embodiment.

Hereinafter, the best modes for carrying out the invention (referred to as embodiments in the following description) will be explained in the order below.

1. Examples of gesture operations in an embodiment
2. Configuration example of the photo frame display device
3. Detection principle of a movement direction by a one-dimensional sensor
4. Conceivable arrangement example of the one-dimensional sensor
5. Arrangement example of the one-dimensional sensor as an embodiment
6. Signal processing configuration for determining the gesture motion
   6-1. Normalization processing, Phase plane mapping processing
   6-2. Determination of gesture motions in the horizontal/vertical directions
   6-3. Determination of direction in left/rightward motions and direction in upward/downward motions
   6-4. Determination of left/right turning motions
7. Algorithm for determining gesture motions
8. Modification example of phase plane mapping processing
9. Modification example concerning the arrangement example of the one-dimensional sensor 1. Examples of Gesture Operations in an Embodiment In the embodiment, a gesture recognition apparatus according to an embodiment of the invention is applied to a photo frame display device. When the photo frame display device according to the embodiment recognizes a given movement/motion (gesture motion) of a hand as a gesture operation performed by a user, the device receives the motion as an operation command and executes appropriate response motion.

FIG. 1 shows an appearance example of the photo frame display device according to the embodiment as a perspective view, and also shows an example of gesture operations performed by the user with respect to the photo frame display device.

A photo frame display device 1 shown in the drawing has an outline shape of a rectangle at the front, having a prescribed width, height and depth.

The photo frame display device 1 in this case has an outline size of, for example, approximately 20 cm to 25 cm in width and approximately 15 cm in height, which is suitable for being put on a table and the like.

On a front part of a body portion 2, a display screen portion 3 on which images are displayed is provided.

The display screen portion 3 is an image panel portion in the display device applied to the photo frame display device 1.

A stand 4 is a part attached on the back side of the body portion 2 for keeping the body portion 2 of the photo frame display device 1 in a state of standing like an actual photo frame.

In this case, a window portion of a sensor unit 5 is provided at a lower central portion of a frame on the front of the body portion 2. The sensor unit 5 is constituted by two pairs of one-dimensional sensors as described later. Detecting elements (infrared detecting elements) included in these one-dimensional sensor are configured so that space detection areas are formed in front of the photo frame display device 1 as well as arranged with a later-described given positional relationship.

In the embodiment, gesture operations to be performed by the user are performed by moving a hand. The user moves his/her hand as gesture operations so that the own hand enters the space detection area of the sensor unit 5 on the front side of the photo frame display device 1.

First, the hand movements (gesture motions) determined as gesture operations in the embodiment are basically defined as the following four motions.

1: Leftward motion of moving a hand from right to left linearly

2: Rightward motion of moving a hand from left to right linearly

3: Upward motion of moving a hand upward linearly

4: Downward motion of moving a hand downward linearly

Additionally, a configuration in which the above four basic gesture motions are recognized is applied in the embodiment, and the following two motions can be further defined as gesture motions.

5: Left-turning motion of moving a hand by making a left-hand turn (counterclockwise) in a circular manner 6: Right-turning motion of moving a hand by making a right-hand turn (clockwise) in a circular manner The photo frame display device 1 according to the embodiment recognizes which motion in the above six gesture operations has been performed based on a sensor signal of the sensor unit 5. Then, the photo frame display device 1 executes the motion corresponding to an operation command assigned to the recognized gesture motion.

Here, an example of assigning operation commands with respect to the respective six gesture motions is cited. The following assigning manner is just an example and other application examples can be variously considered.

First, the respective leftward/rightward motions are assigned as operation commands of fast-forwarding/reviewing of images displayed in the photo frame display device 1.

The photo frame display device 1 of the embodiment is capable of displaying images stored in a memory in a slide show, which displays images sequentially at fixed time intervals. The respective upward/downward motions are assigned as operation commands for start/stop of the slide show display.

The photo frame display device 1 can also display a clock, a calendar and the like in addition to photo images, and can switch the display in accordance with operations. The left-turning/right-turning motions are assigned as operation commands for switching display in accordance with a given fast-forwarding order and a reviewing order.

2. Configuration Example of the Photo Frame Display Device

Figure 2:
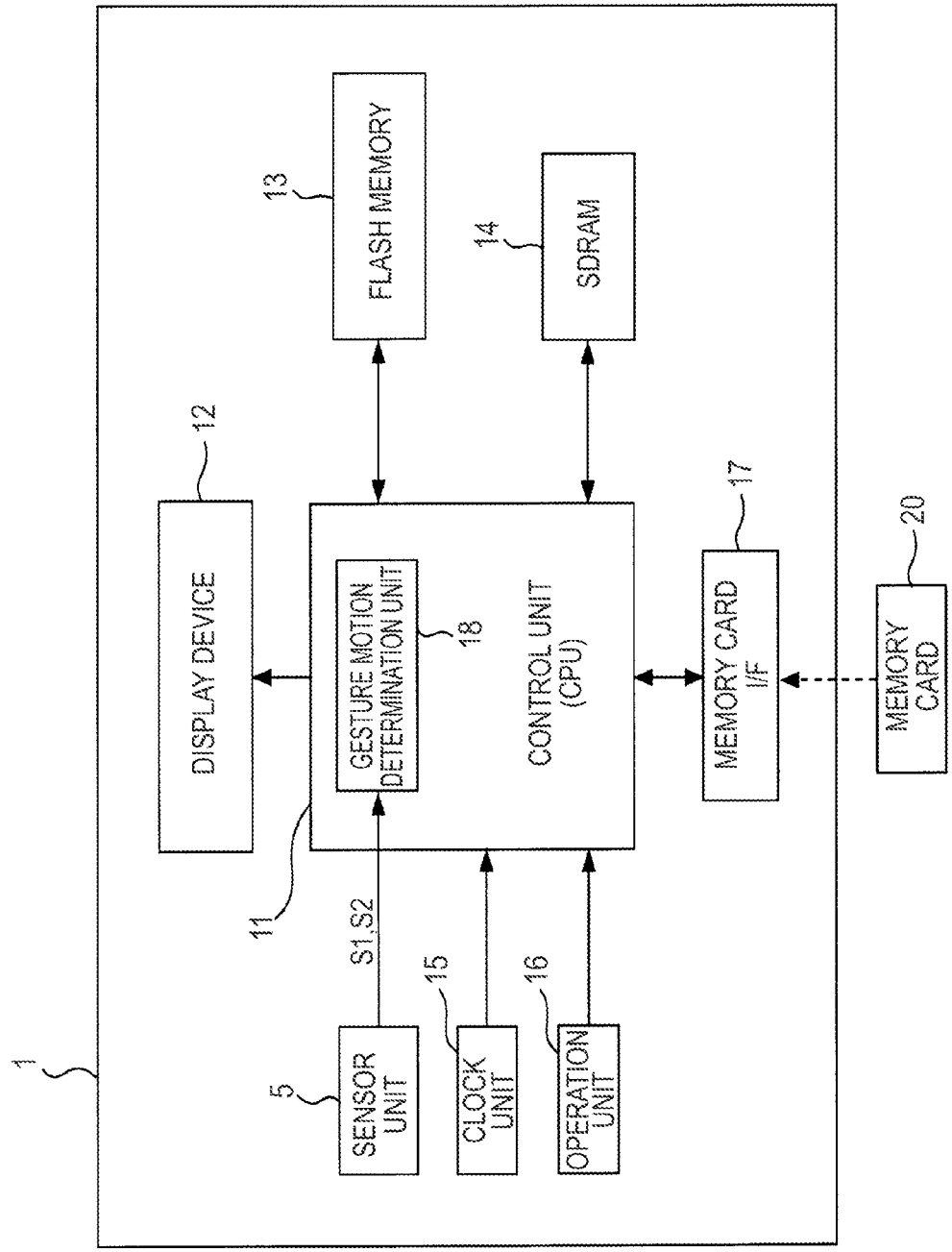
FIG. 2 is a block diagram showing a configuration example of the photo frame display device.

FIG. 2 shows an internal configuration example of the photo frame display device 1 which can be applied as the embodiment.

As shown in the drawing, the photo frame display device 1 according to the embodiment includes a control unit (CPU: Central Processing Unit) 11, a display device 12, a flash memory 13, a SDRAM 14, a clock unit 15, an operation unit 16, a memory card interface 17 and the sensor unit 5.

The control unit 11 includes hardware as, for example, the CPU. The CPU as the control unit 11 reads a program stored in the flash memory 13 and loading the program in, for example, the SDRAM 14, then, executes the read program. Accordingly, necessary operations as the photo frame display device 1 can be appropriately obtained.

The SDRAM 14 is a main storage device of the control unit 11, and the flash memory 13 is an auxiliary storage device.

The flash memory 13 in this case is included in the photo frame display device 1 in a static manner. The flash memory 13 stores image data read from a memory card 20 and transferred in addition to the program.

The display device 12 includes a display panel and a drive circuit unit driving the display panel, in which the drive circuit executes operations for display drive in accordance with image display control of the control unit 11 to thereby display images on the display panel. A portion on which images are displayed as the display panel corresponds to the display screen portion 3 exposed in the front portion of the body portion 2.

In the embodiment, a liquid crystal display is applied as the display device 12, however, it is also preferable that other display devices such as an organic EL display device can be applied.

The clock unit 15 is a portion for clocking present time. In this case, the clock unit 15 can clock year, month and day as well as hour, minute and second as present time. The control unit 11 can read and obtain present time clocked by the clock unit 15.

The operation unit 16 in this case indicates operation elements included in the photo frame display device 1 in an integrated manner. When an operation is performed to the operation element included in the operation unit 16, an operation command signal corresponding to the operation is outputted to the control unit 11. The control unit 11 executes necessary control/processing in response to the inputted operation signal appropriately.

In the case that operations with respect to the photo frame display device 1 are allowed to be performed by using a remote controller, the operation unit 16 also includes a remote controller provided separately from the photo-frame display device 1 and a receiving unit provided on the side of the photo frame display device 1, which receives and demodulates a command signal transmitted from the remote controller and transmitting the signal to the control unit 11 as an operation signal.

The photo frame display device 1 of the embodiment is configured to execute appropriate operations in response to the gesture operations, however, the device includes the configuration of the operation unit 16 as appropriate operation elements. For example, when there are various operations with respect to the photo frame display device 1, there may exist operations which are difficult to be expressed by gesture operations, however, these operations can be performed by providing with the operation unit 16. In addition, when a function of dealing with gesture operations such as the sensor unit 5 is out of order or in other occasions, the same operation can be performed by operating the operation unit 16.

The memory card interface 17 includes a portion on which the memory card 20 which is an external storage device is mounted, which is configured to be able to at least read data as data access with respect to the mounted memory card 20 under control of the control unit 11. The data read from the memory card 20 is transferred to the control unit 11.

A basic use example of the photo frame display device 1 having the above configuration and corresponding display operations of the photo frame display device 1 will be explained.

The user mounts the memory card 20 in which image data taken by, for example, a digital camera and the like is stored on the photo frame display device 1 and performs an operation for displaying images.

In response to the operation, the control unit 11 reads image data stored in the memory card 20 through the memory card interface 17 and executes control for displaying data as images in the display device 12.

Accordingly, images of image data stored in the memory card 20 mounted by the user are displayed on the display screen portion 3 of the photo frame display device 1.

It is also possible to store the image data read from the memory card 20 to be taken in the flash memory 13, and to display image data stored in the flash memory 13.

In this case, first, the user mounts the memory card 20 on the photo frame display device 1 and executes an operation for transferring image data stored in the memory card 20 to the flash memory 13 and stores the data therein. At this time, the photo frame display device 1 is configured to perform an operation of selecting image data to be stored in the flash memory 13 from image data stored, for example, in the memory card 20.

In accordance with the operation, the control unit 11 sequentially reads image data selected from the memory card 20 and executes a write instruction as well as transfers data with respect to the flash memory 13 through the memory card interface 17. The flash memory 13 writes the transferred image data in response to the instruction and stores the image data so as to be managed according to files. The image data managed according to files in the flash memory 13 is still image data and managed as image files in a JPEG (Joint Photographic Expert Group) format in this case. The flash memory 13 applies FAT as a file system though it is just an example.

After that, when the user performs an operation for displaying images stored in the flash memory 13, the control unit 11 reads a necessary image data file from image data files stored in the flash memory 13. The control unit 11 executes control for playing back the image data file and displaying images in the display device 12.

The photo frame display device 1 of the embodiment can play back and display image data as the following examples.

First, the photo frame display device 1 can perform display of a piece of image, in which only one image data selected from image data stored in the flash memory 13 or the memory card 20 is displayed continuously.

The photo frame display device 1 can also perform display of a so-called slide show, in which plural images selected from image data stored in the flash memory 13 or the memory card 20 are sequentially displayed so as to be changed at fixed time intervals. In the slide show display, it is possible to display images one by one at fixed time intervals as well as to display images by plural pieces of images at fixed time intervals.

Furthermore, the photo frame display device 1 of the embodiment can also display a clock indicating present time, a calendar and the like. It is possible to play back and display image data stored in the flash memory 13 or the memory card 20 simultaneously with the clock, the calendar and the like.

Additionally, it is possible to display thumbnail images of image data stored in the flash memory 13 or the memory card 20 in a list.

It is also preferable that, for example, a data interface such as a USB is provided in the configuration shown in FIG. 2 and image data is read through such data interface. The change or addition with respect to the configuration can be appropriately performed, and the internal configuration of the photo frame display device 1 is not limited to the configuration shown in FIG. 2.

3. Detection Principle of a Movement Direction by a One-Dimensional Sensor

In the embodiment, a one-dimensional sensor which is a sensor detecting movement in one dimension, namely, uniaxial direction is applied as the sensor unit 5.

Some types of one-dimensional sensors are known, and a so-called dual-type pyroelectric sensor having two infrared detecting elements is applied in the embodiment. The pyroelectric sensor as such is a sensor which outputs a signal corresponding to the temperature difference between the background and an object (object radiating infrared radiation) by performing detection of infrared radiation applying pyroelectric effects in a known manner.

Figure 3:
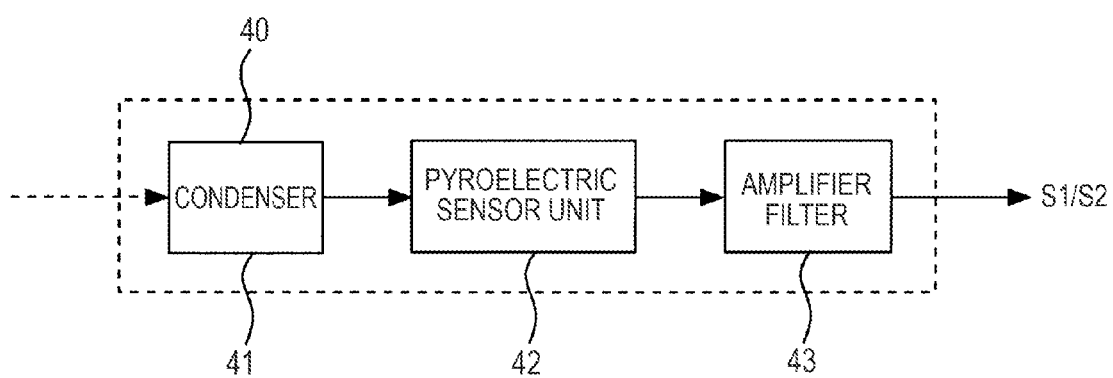
FIG. 3 is a block diagram showing a configuration example of a one-dimensional sensor.

A configuration example of a device as the one-dimensional sensor using the pyroelectric sensor is shown in FIG. 3.

A one-dimensional sensor 40 shown in FIG. 3 includes a condenser 41, a pyroelectric sensor unit 42 and an amplifier filter 43.

The condenser 41 is formed by, for example, a Fresnel lens so that incident light is condensed by separating the light with respect to two infrared detecting elements in the pyroelectric sensor unit 42.

The dual-type pyroelectric sensor unit 42 includes two infrared detecting elements arranged so as to correspond to a uniaxial detection axis corresponding to one dimension.

Each of the two infrared detection elements detects the temperature difference between an object in a space detection area corresponding to each arranged position and the background, outputting a signal corresponding to the temperature difference to be detected. The pyroelectric sensor unit 42 synthesizes signals from the two infrared detecting elements and outputs a signal as a detection signal. The detection signal shows a movement direction in the uniaxial direction.

The amplifier filter 43 performs filtering processing of filtering only frequency components higher than a prescribed frequency for removing noise components and so on and performs amplification with respect to the detection signal, then, outputs the signal as a sensor signal.

The detection principle of the movement direction by the pyroelectric sensor 42 will be explained with reference to FIG. 4A and FIG. 4B.

The dual-type pyroelectric sensor 42 includes two infrared detecting elements 51A, 51B as shown in the drawing. The infrared detecting elements 51A, 51B are inserted between a gate terminal of a transistor Tr and an external gate terminal G of the pyroelectric sensor 42 so as to be connected in series. Here, the infrared detecting elements 51A, 51B are connected in series at negative electrodes thereof. That is, the infrared detecting elements 51A, 51B are connected in series with inverted polarities to each other. A positive electrode of the infrared detecting element 51A is connected to the gate terminal of the transistor and a positive electrode of the infrared detecting element 51B is connected to the external gate terminal G.

A resistance R1 is connected in parallel to the serial connection of the infrared detection elements 51A, 51B. Additionally, a gate/source resistance R2 is inserted between the external gate terminal G and a drain D.

The detection principle of the movement direction by the pyroelectric sensor 42 will be explained with reference to FIG. 4A and FIG. 4B.

Figure 4A:
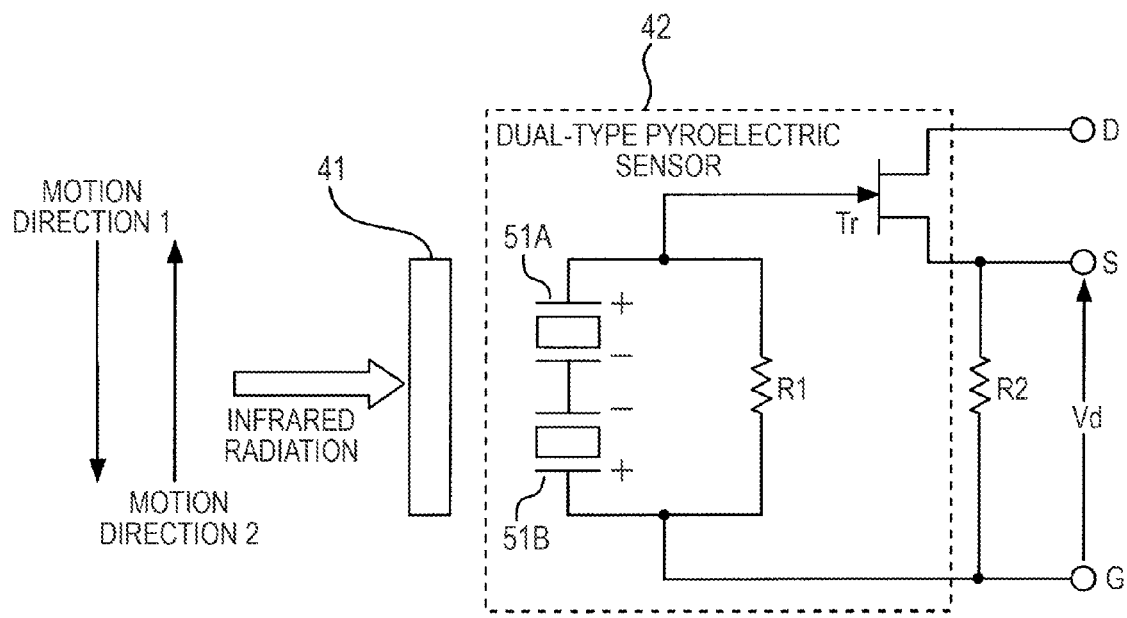
FIG. 4A and FIG. 4B views showing a configuration example of a dual-type pyroelectric sensor as the one-dimensional sensor.
Figure 4B:
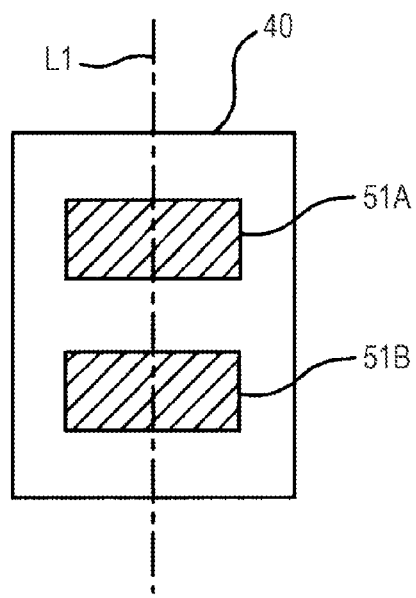

The dual-type pyroelectric sensor 42 includes two infrared detecting elements 51A, 51B as shown in FIG. 4A. The infrared detecting elements 51A, 51B are physically arranged in accordance with a positional relationship described later by FIG. 4B, on which infrared radiation condensed through the condenser 41 is incident.

The infrared detecting elements 51A, 51B are inserted between the gate terminal of the transistor Tr and the external gate terminal G of the pyroelectric sensor 42 so as to be connected in series in the manner shown in the figure. Here, the infrared detecting elements 51A, 51B are connected in series at negative electrodes thereof. That is, the infrared detecting elements 51A, 51B are connected in series with reverse polarity. The positive electrode of the infrared detecting element 51A is connected to the gate terminal of the transistor Tr and the positive electrode of the infrared detecting element 51B is connected to the external gate terminal G.

The resistance R1 is connected in parallel to the serial connection of the infrared detection elements 51A, 51B. Additionally, the gate/source resistance R2 is inserted between the external gate terminal G and the drain terminal D.

The detection signal of the pyroelectric sensor 42 is obtained as a gate/source voltage Vd between a source terminal S and the gate terminal G.

In the device as the one-dimensional sensor 40, the infrared detecting elements 51A, 51B are arranged so as to receive external light through the condenser 41. FIG. 4B schematically shows an example of a physical arrangement the infrared detecting elements 51A, 51B in the one-dimensional sensor 40. In the drawing, the infrared detecting element 51A is placed at the upper side and the infrared detecting element 51B is placed at the lower side at a certain fixed interval. A direction corresponding to a dashed line passing through the infrared detecting elements 51A, 51B along the longitudinal (vertical) direction will be a detection axis L of the pyroelectric sensor unit 42 corresponding to the arrangement. That is, in the arrangement direction of the infrared detecting elements 51A, 51B corresponding to the space of FIG. 4B, whether the movement direction along the longitudinal (vertical) direction is upward movement or downward movement will be detected. When allowing FIG. 4B to correspond to linear motion directions 1, 2 of FIG. 4A, the motion direction 1 will be the upward movement and the motion direction 2 will be the downward movement.

The motion directions 1, 2 are motions in reverse directions to each other, namely, when the positive direction is the motion direction 1, the operation direction 2 is the reverse direction.

Assume that a linear movement of an object occurs in the motion direction 1 in FIG. 4A. In response to this movement, first, a change of temperature difference between the background and the object caused by the movement is detected by the infrared detecting element 51A which is closer to a movement start position first, then, the change is detected by the infrared detecting element 51B with a time difference.

Strictly, the infrared detecting element detects the change of temperature difference between the background and the object caused by the movement in response to the movement of the object along the detection axis L. In the following description, "detection of the change of temperature difference between the background and the object caused by the movement" is written as "detection of movement" by the infrared detecting elements for making the description easier.

FIG. 5A shows respective signals Sa, Sb of the infrared detecting elements 51A, 51B outputted in accordance with the movement in the motion direction 1 and a detection signal Vd of the pyroelectric sensor unit 42.

The signal Sa of the infrared detecting element 51A in this case indicates that a sine wave in a positive level rises at a point "t0" in accordance with the start of detecting movement and the sine wave becomes 0-amplitude at a point "t2" in accordance with the end of detecting movement.

On the other hand, the infrared detecting element 51B starts detecting the movement at a later point than the infrared detecting element 51A. In FIG. 4A, the signal Sb indicates that the detection is started at a point "t1". Accordingly, the signal indicates that a sine wave in a negative level is generated at the point "t1". Then, the sine wave becomes 0-level at a point "t3" in accordance with the end of detecting movement.

As explained with reference to FIG. 4A, the infrared detecting element 51A and the infrared detecting element 51B are connected with reverse polarity. Therefore, waveforms of the signal Sa, Sb obtained by detecting movement are inverted to each other.

The detection signal Vd is obtained by synthesizing the signals Sa, Sb as can be seen from the circuit of FIG. 4A.

That is to say, the detection signal Vd shown in FIG. 5A becomes a sine wave in the positive level for a half cycle which is the same as the signal Sa during the point "t0" to the point "t1". Since the signal Sa and the signal Sb are synthesized, the signal becomes a sine wave in the negative level for a half cycle during the point "t1" to the point "t2", which has approximately double the absolute value of the period from the point "t0" to the point "t1". Then, a sine wave in the positive level for a half cycle which is the same as the signal Sb appears during the point "t2" to the point "t3".

On the other hand, when the linear movement of the object in the motion direction 2 in FIG. 4A occurs, first, the detection of the movement is started by the infrared detecting element 51B, then, the detection is started by the infrared detecting element 51A.

FIG. 5B shows respective signals Sa, Sb of the infrared detecting element 51A, 51B and the detection signal Vd.

In FIG. 5B, the signal Sa indicates that a sine wave in the positive level rises from the point "t1. The signal Sb indicates that a sine wave in the negative level is started at the point "t0".

Then, the detection signal Vd becomes a sine wave in the negative level for a half cycle which is the same as the signal Sb during the point "t0" to the point "t1". Since the signal Sa and the signal Sb are synthesized, the signal becomes a sine wave in the positive level for a half cycle during the point "t1" to the point "t2", which has approximately double the absolute value of the period from the point "t0" to the point "t1". Then, a sine wave in the negative level for a half cycle which is the same as the signal Sa appears during the point "t2" to the point "t3".

When comparing the detection signal Vd of FIG. 5A with the detection signal Vd of FIG. 5B, waveform patterns thereof are different so as to be inverted to each other. That is, the movement direction along the detection axis L is shown by the waveform pattern of the detection signal Vd.

4. Conceivable Arrangement Example of the One-Dimensional Sensor

Here, in the embodiment, the leftward motion, the rightward motion, the upward motion, the downward motion, the right-turning motion and left-turning motion are recognized as gesture motions as explained with reference to FIG. 1.

In order to make the explanation easier and comprehensible, only four motions, namely, the leftward motion, the rightward motion, the upward motion and the downward motion are assumed to be detected in the above six gesture motions.

A case in which the dual-type pyroelectric sensor explained with reference to FIG. 3 to FIG. 5B is applied as the one-dimensional sensor is considered. It becomes necessary that gesture operations in the horizontal direction by leftward/rightward motions and gesture operations in the vertical direction by upward/downward motions can be detected. That is, it is necessary to detect motion directions of two axes which are different from each other.

Accordingly, two detection axes, which are a detection axis corresponding to the horizontal (transversal) direction and a detection axis corresponding to the vertical (longitudinal) direction, therefore, two one-dimensional sensors are also necessary as the detection axes of the one-dimensional sensor.

Figure 6A:
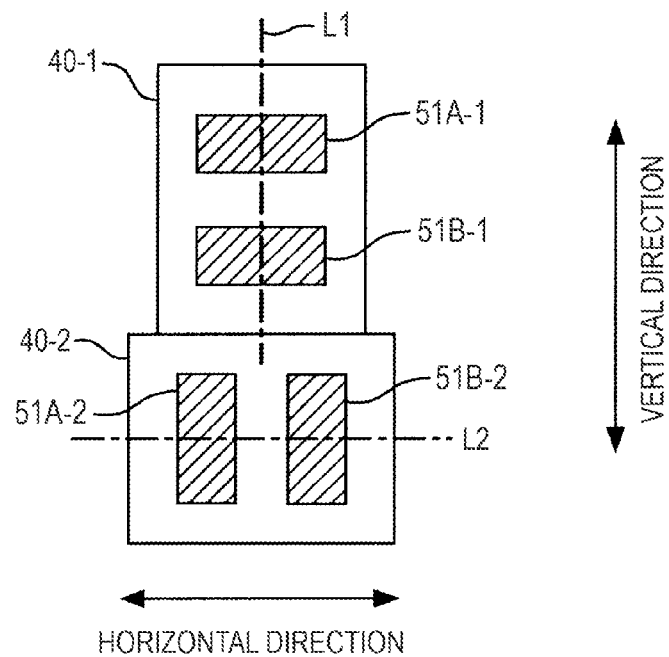
FIG. 6A and FIG. 6B are views showing a conceivable arrangement example of one-dimensional sensors for detecting gesture motions along two-axes directions of horizontal/vertical directions.
Figure 6B:
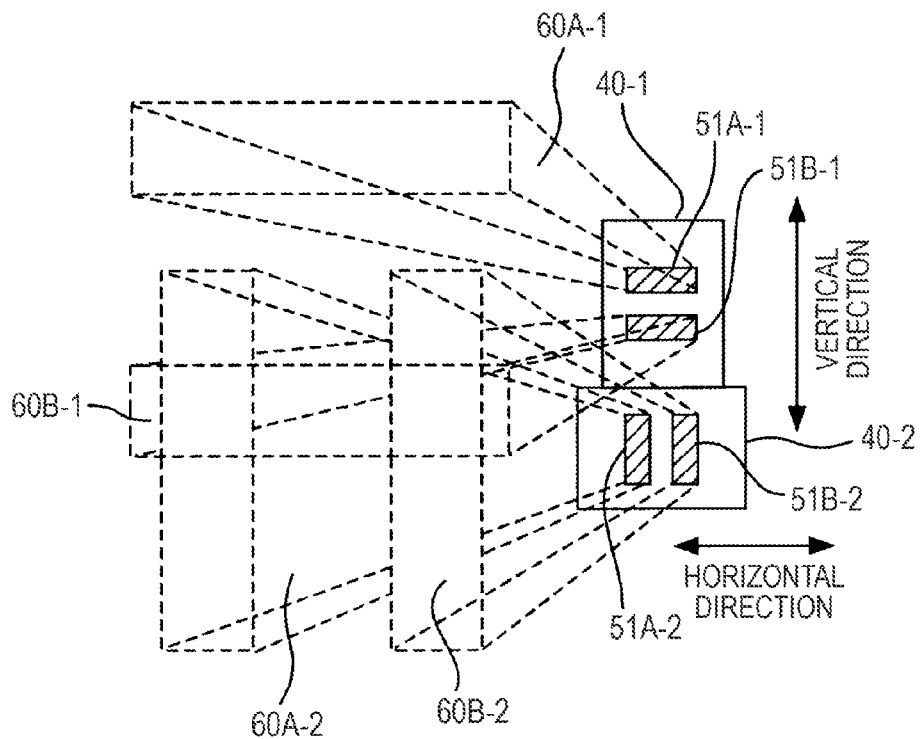

An example of arrangement of the above two one-dimensional sensors which is simply conceivable is shown in FIG. 6A and FIG. 6B.

In FIG. 6A, two one-dimensional sensors 40-1, 40-2 are shown. The detection axis of the one-dimensional sensor 40-1 is L1, and the detection axis of the one-dimensional sensor 40-2 is L2.

The one-dimensional sensor 40-1 is arranged so that the detection axis L1 corresponds to the vertical (longitudinal) direction. On the other hand, the one-dimensional sensor 40-2 is arranged so that the detection axis L2 corresponds to the horizontal (transversal) direction. That is, the one-dimensional sensors 40-1, 40-2 are arranged in a positional relationship in which the detection axes thereof are orthogonal to each other.

Here, the one-dimensional sensor 40-2 is arranged below the one-dimensional sensor 40-1.

FIG. 6B shows examples of space detection areas formed in accordance with the arrangement of the one-dimensional sensors 40-1, 40-2 shown in FIG. 6A. One space detection area indicates a space area in which movement of the object can be detected by corresponding one infrared detecting element 51. The space detection area will be the limited space schematically formed by tracks of an outer frame of corresponding one infrared detecting element 51 when the frame is enlarged and projected in the space to an available detection direction.

First, on the side of the one-dimensional sensor 40-1, a space detection area 60A-1 is formed corresponding to an infrared detection element 51A-1 positioned at the upper side, and a space detection area 60B-1 is formed corresponding to an infrared detection element 51B-1 positioned at the lower side.

The space detection areas 60A-1, 60B-1 form spaces having a rectangular shape in cross section which is extending in the horizontal direction in accordance with the shape and the arrangement angle of the corresponding infrared detection element 51A-1, 51B-1. Concerning positional relationship, the space detection area 60A-1 is arrange at the upper side and the space detection area 60B-1 is arranged at the lower side in accordance with the positional relationship of arrangement of the corresponding infrared detection element 51A-1, 51B-1.

On the side of the one-dimensional sensor 40-2, a space detection area 60A-2 is formed corresponding to an infrared detection element 51A-2 positioned at the left side, and a space detection area 60B-2 is formed corresponding to an infrared detection element 51B-2 positioned at the right side.

The space detection areas 60A-2, 60B-2 form spaces having a rectangular shape in cross section in which the horizontal direction is a short edge in accordance with the shape and the arrangement angle of the corresponding infrared detection element 51A-2, 51B-2. Concerning positional relationship, the space detection area 60A-2 is arrange at the left side and the space detection area 60B-2 is arranged at the right side in accordance with the positional relationship of arrangement of the corresponding infrared detection element 51A-2, 51B-2.

When the above arrangement of the one-dimensional sensors 40-1, 40-2 is applied, respective gesture motions of up and down, left and right can be detected as long as based on the detection principle of the one-dimensional sensor which has been explained.

In the case that the rightward motion is performed as an example, first, a user's hand (object) which performs the rightward motion passes through the space detection area 60A-2, then, passes through the space detection area 60A-1 on the side of the one-dimensional sensor 40-2. In response to this, the infrared detecting elements 51A-2, 51B-2 detect the motion with the time difference, outputs the signals Sa, Sb and outputs the significant detection signal Vd as shown in FIG. 5A and FIG. 5B. The detection signal Vd indicates that the object has been moved in the right direction.

On the other hand, the object passes through the space detection areas 60A-1, 60A-2 at the same time on the side of the one-dimensional sensor 40-1 in which the detection axis is along the vertical direction. The signals Sa, Sb outputted from the infrared detection elements 51A-1, 51B-1 are in reverse phases as can be seen from, for example, FIG. 5A and FIG. 5B. Therefore, the detection signal Vd is in the 0-level. That is, the signal indicates that there is no movement along the up and down directions.

Also in the case that the upward or downward gesture motion is performed, the detection signal Vd of the one-dimensional sensor 40-1 indicates, in principle, that the object has moved in the upward or downward direction as obvious from the above explanation. The detection signal Vd of the one-dimensional sensor 40-2 indicates that there is not the movement in the right and left directions.

However, the present inventors have confirmed that it is extremely difficult to actually recognize up/down and right/left gesture motions according to the arrangement of the one-dimensional sensors shown in FIG. 6A and FIG. 6B.

Figure 7A:
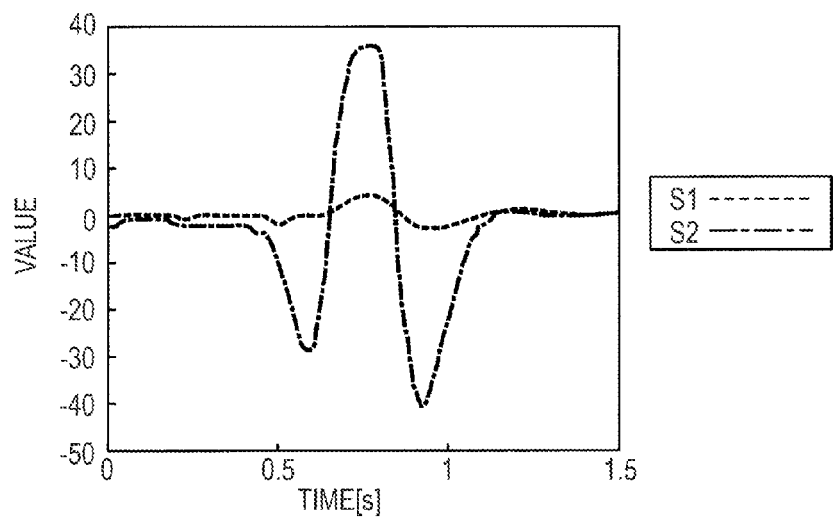
FIG. 7A to FIG. 7C are waveform diagrams showing sensor signals obtained under the arrangement example shown in FIG. 6A and FIG. 6B.
Figure 7B:
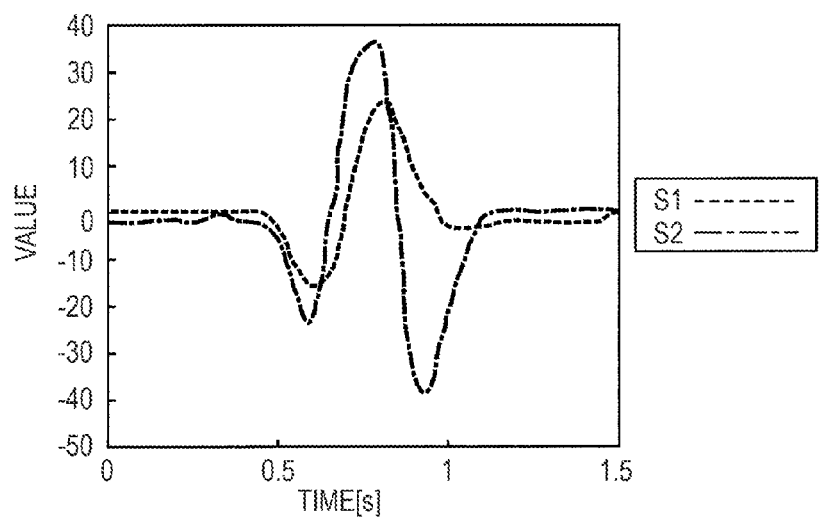
Figure 7C:
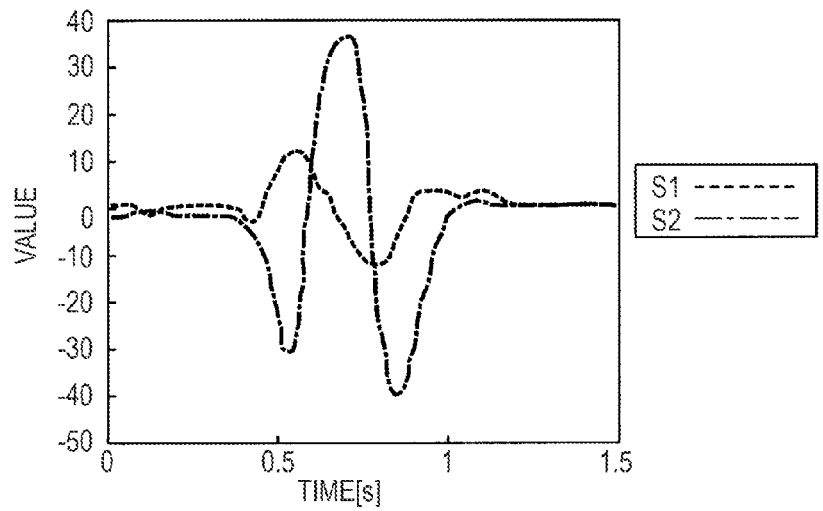

FIG. 7A, FIG. 7B and FIG. 7C respectively show a sensor signal S1 and a sensor signal S2 obtained when the rightward motion as the gesture motion was performed under the arrangement of the one-dimensional sensors 40-1, 40-2 shown in FIG. 6A and FIG. 6B as experimental results by the present inventors. The sensor signal S1 is a signal outputted from the one-dimensional sensor 40-1 in which the detection axis is along the vertical direction and the sensor signal S2 is a signal outputted from the one-dimensional sensor 40-2 in which the detection axis is along the horizontal direction, and waveforms thereof correspond to the detection signal Vd outputted from the internal pyroelectric sensor unit 42.

As shown in FIG. 7A, FIG. 7B and FIG. 7C, in the sensor signal S2 which is the detection output corresponding to the detection axis in the horizontal direction, approximately the same waveforms corresponding to the detection of the rightward motion were obtained. That is, the rightward motion was stably detected only concerning the side of the one-dimensional sensor 40-2.

On the other hand, in the sensor signal S1 corresponding to the detection axis in the vertical direction, the approximately 0-level should be maintained normally. However, the actually obtained sensor signal S1 has sometimes extremely small amplitude as shown in FIG. 7A and has sometimes large amplitude as shown in FIGS. 7B and 7C. Furthermore, the phase of the sensor signal S1 with respect to the sensor signal S2 was approximately the same in the case of FIG. 7B, whereas it was the reverse phase in the case of FIG. 7C. Accordingly, the sensor signal S1 was not constant in the appearance thereof both in the amplitude and the phase.

As described above, the sensor signal of the one-dimensional sensor in which the detection axis is along the direction of movement as the gesture motion is stable, however, the sensor signal of the one-dimensional sensor in which the detection axis is along the direction orthogonal to the motion direction is unstable.

One of the main causes that leads to instability of the sensor signal as described above can be cited as follows.

That is, the actual movement direction of the object does not strictly correspond to detection axes of the infrared detecting elements. Therefore, even when the object is intended to be moved along one detection axis, if the movement direction is inclined with respect to one detection axis, signal amplitude caused by the inclination occurs at the infrared detecting element corresponding to the other detection axis.

For example, when the object moves upward in some measure while performing the rightward motion, the amplitude indicating upward movement occurs in the sensor signal of the one-dimensional sensor 40-1, and when the object also moves downward to some measure, the amplitude indicating downward movement occurs in the sensor signal of the one-dimensional sensor 40-1.

In the case that the sensor signal is unstable as described above, it is significantly difficult to discriminate whether the sensor signal is a gesture motion in the right/left (horizontal) directions or a gesture motion in the up/down (vertical) directions, even when the sensor signal corresponding to the gesture motion can be obtained.

For example, as the most conspicuous case, assume that the amplitude of the sensor signal corresponding to the detection axis orthogonal to the direction of the gesture motion is increased to the same degree as the amplitude of the sensor signal corresponding to the detection axis corresponding to the direction of the gesture motion.

In order to obtain correct gesture recognition results, it is necessary to select the sensor signal corresponding to the true direction of the gesture motion from the sensor signal S1, S2. Here, when the sensor signal corresponding to the true direction of the gesture motion is selected, for example, simply based on the size of the amplitude level, there is high probability that the wrong selection is made in the above state. When the selection is made in accordance with an algorithm in which the sensor signal having a waveform nearer to a waveform pattern which can appear in accordance with the gesture motion is selected as the sensor signal corresponding to the true direction of the gesture motion, the probability that a waveform of the sensor signal not corresponding to the true direction of the gesture motion becomes nearer to the waveform pattern may be high because both the phase and the amplitude are unstable.

Accordingly, it is difficult to obtain gesture recognition results having high reliability in the arrangement example of the one-dimensional sensors 40-1, 40-2 shown in FIG. 6A.

5. Arrangement Example of the One-Dimensional Sensor as an Embodiment

In the embodiment, it is desirable to obtain higher recognition accuracy in the gesture recognition using the one-dimensional sensor as compared with the related art.

First, the four gesture motions corresponding to up and down, left and right are fundamental motions in the embodiment as shown in FIG. 1. That is, operation directions to be recognized as gesture motions are, in the first place, the horizontal (transversal) direction (first direction) and the vertical (longitudinal) direction (second direction).

Figure 8A:
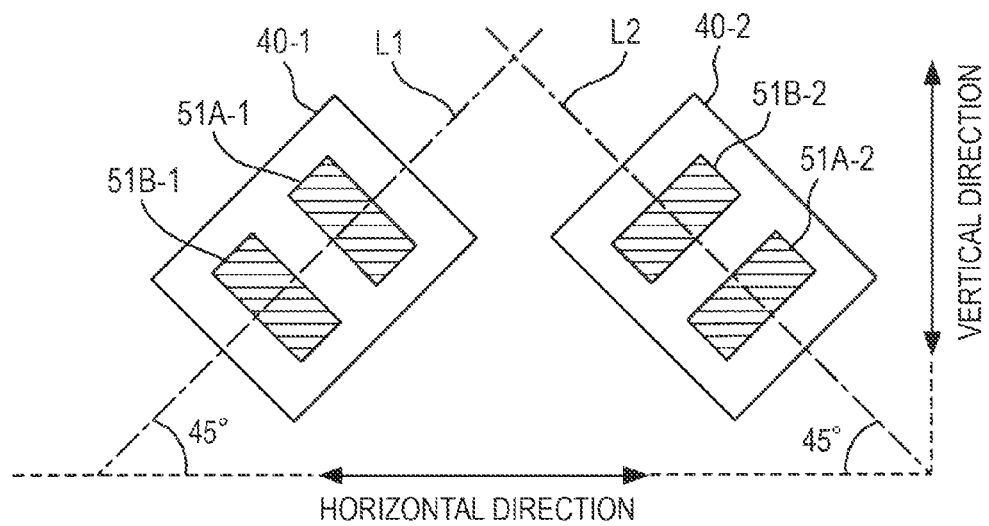
FIG. 8A and FIG. 8B are views showing an arrangement example of one-dimensional sensors according to an embodiment.

On the assumption of the above, a physical arrangement example of the one-dimensional sensors 40-1, 40-2 is given as shown in FIG. 8A in the embodiment.

That is, the one-dimensional sensor 40-1 is arranged so that the detection axis L1 is inclined at an angle of 45 degrees with respect to the horizontal/vertical directions. In this case, the sensor is inclined to the right when seen from an operator side (front direction). Concerning up and down directions of the one-dimensional sensor 40-1, it is arranged so that the infrared detecting element 51A-1 is at the upper side and the infrared detecting element 51B-1 is at the lower side.

The one-dimensional sensor 40-2 is also arranged so that the detection axis L2 is inclined at an angle of 45 degrees with respect to the horizontal/vertical directions. However, the sensor is inclined to the left side opposite to the one-dimensional sensor 40-1, which gives the detection axis L2 the inclination of 45 degrees so as to be orthogonal to the detection axis L1 of the one-dimensional sensor 40-1.

In this case, the sensor is arranged so that the infrared detecting element 51B-2 is at the upper side and the infrared detecting element 51A-2 is at the lower side in the above inclination state.

Figure 8B:
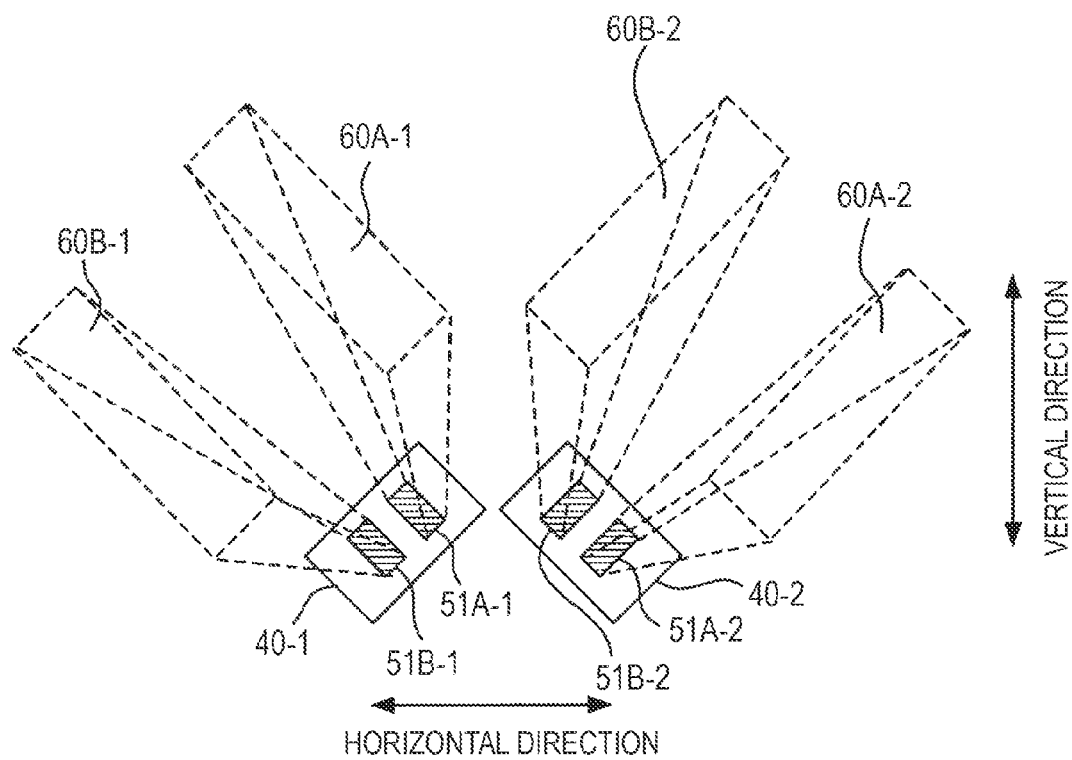

FIG. 8B shows space detection areas 60A-1, 60B-1, 60A-2 and 60B-2 corresponding to the infrared detecting elements 51A-1, 51B-1, 51A-2 and 51B-2, which are formed in accordance with the arrangement of the one-dimensional sensors 40-1, 40-2 of FIG. 8A.

According to the arrangement shown in FIG. 8B, first, in the one-dimensional sensor 40-1, displacement of positions along the horizontal direction can be obtained in the infrared detecting elements 51A-1, 51B-1. Similarly, displacement of positions along the vertical direction can be also obtained.

Accordingly, the infrared detecting elements 51A-1, 51B-1 can detect the movement with time difference in accordance with the gesture motion of upward/downward motions along the vertical direction. Similarly, they can detect the movement with time difference also in accordance with the gesture motion of leftward/rightward motions along the horizontal direction. Accordingly, the infrared detecting elements 51A-1, 51B-1 can output the signals Sa, Sb explained with reference to FIG. 5A and FIG. 5B so as to correspond to any gesture motion in the horizontal/vertical directions. That is, the one-dimensional sensor 40-1 can detect the movement corresponding to any gesture motion in the one gesture motion in the horizontal/vertical directions and output the stable sensor signal S1.

Similarly, the one-dimensional sensor 40-2 also can detect the movement so as to correspond to any gesture motion in the horizontal/vertical directions and output the stable sensor signal S2.

Figure 9:
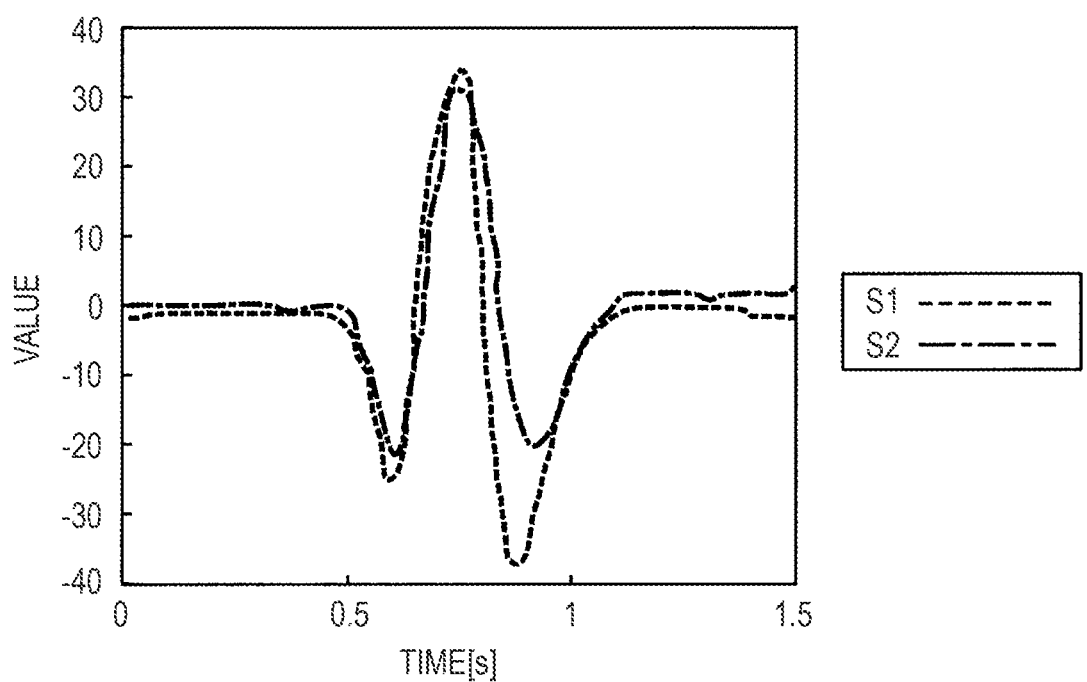
FIG. 9 is a waveform diagram showing sensor signals obtained under the arrangement example of one-dimensional sensors according to the embodiment.

FIG. 9 shows the sensor signal S1 and the sensor signal S2 obtained when the rightward motion was performed as the gesture motion under the arrangement example of the one-dimensional sensors 40-1, 40-2 shown in FIG. 8A and FIG. 8B as experimental results by the present inventors.

In the case of the arrangement example of the one-dimensional sensors 40-1, 40-2 (infrared detecting elements 51A-1, 51B-1, 51A-2 and 51B-2) shown in FIG. 8A and FIG. 8B, both the sensor signals S1, S2 can obtain waveforms corresponding to the detecting signal Vd FIG. 5B when detecting the rightward motion. Both the sensor signal S1, S2 shown in FIG. 9 have waveforms corresponding to the detection signal Vd of FIG. 5B. It was confirmed that the waveform which can be regarded as equal to FIG. 9 can be stably obtained in the sensor signals S1, S2 by experiment.

Here, waveforms of the sensor signals S1, S2 obtained when respective gesture motions of up and down, left and right are performed under the arrangement of the one-dimensional sensor 40-1 (infrared detecting elements 51A-1, 51B-1) and the one-dimensional sensor 40-2 (infrared detecting elements 51A-2, 51B-2) shown in FIG. 8A and FIG. 8B are schematically shown in FIG. 10A to FIG. 10D.

The waveforms shown here have been obtained by excluding the difference of detection time generated in accordance with the physical distance difference between the pair of the space detection areas 60A-1, 60B-1 corresponding to the one-dimensional sensor 40-1 (infrared detecting elements 51A-1, 51B-1) and the pair of the space detection areas 60A-2, 60B-2 corresponding to the one-dimensional sensor 40-2 (infrared detecting elements 51A-2, 51B-2).

If the space detection areas cross one another on the space, it will not be an obstacle for the detection on the side of the infrared detecting elements. Therefore, in actual detection, the space detection areas 60A-1, 60B-1 corresponding to the one-dimensional sensor 40-1 (infrared detecting elements 51A-1, 51B-1) and the space detection areas 60A-2, 60B-2 corresponding to the one-dimensional sensor 40-2 (infrared detecting elements 51A-2, 51B-2) are adjusted to be overlapped with one another to thereby exclude problems due to the difference of detection time.

FIG. 10A shows the sensor signal S1, S2 obtained by detecting movement as the leftward motion. As shown in the drawing, the sensor signals S1, S2 have waveforms in phase with each other corresponding to the detection signal Vd of FIG. 5A in response to the leftward motion.

FIG. 10B shows the sensor signals S1, S2 obtained in the case of the rightward motion. The sensor signals S1, S2 in the case of the rightward motion have waveforms which are inverted with respect to the waveforms of FIG. 10A. That is, the sensor signals S1, S2 have waveforms in phase with each other corresponding to the detection signal Vd of FIG. 5B. The waveforms of FIG. 9 correspond to waveforms of FIG. 10B.

FIG. 10C shows the sensor signals S1, S2 obtained by detecting movement as the upward motion.

In this case, the sensor signal S1 has a waveform corresponding to the detection signal Vd of FIG. 5A and the sensor signal S2 has a waveform corresponding to the detection signal Vd of FIG. 5B, which are out of phase with each other.

FIG. 10D shows the sensor signals S1, S2 obtained by detecting movement as the downward motion.

The sensor signals S1, S2 in this case have waveforms which are respectively inverted with respect to the waveforms of FIG. 10C. That is, the sensor signal S1 has a waveform corresponding to the detection signal Vd of FIG. 5B and the sensor signal S2 has a waveform corresponding to the detection signal Vd of FIG. 5A, which are out of phase with each other.

According to the above FIG. 10A to FIG. 10D, first, the recognition whether the gesture motion is along the horizontal direction or along the vertical direction can be determined based on whether the sensor signals S1, S2 are in phase or out of phase with each other. Furthermore, whether the gesture motion along the horizontal direction is the leftward motion or the rightward motion and whether the gesture motion along the vertical direction is the upward motion or the downward motion may be determined based on the polarity of the sensor signals S1, S2.

6. Signal Processing Configuration for Determining the Gesture Motion 6-1. Normalization Processing, Phase Plane Mapping Processing In the present embodiment, a configuration in which the gesture recognition is performed by performing signal processing of the sensor signals S1, S2 in the manner explained below under the arrangement example of the one-dimensional sensors 40-1, 40-2 of FIG. 8A and FIG. 8B.

Figure 11A:
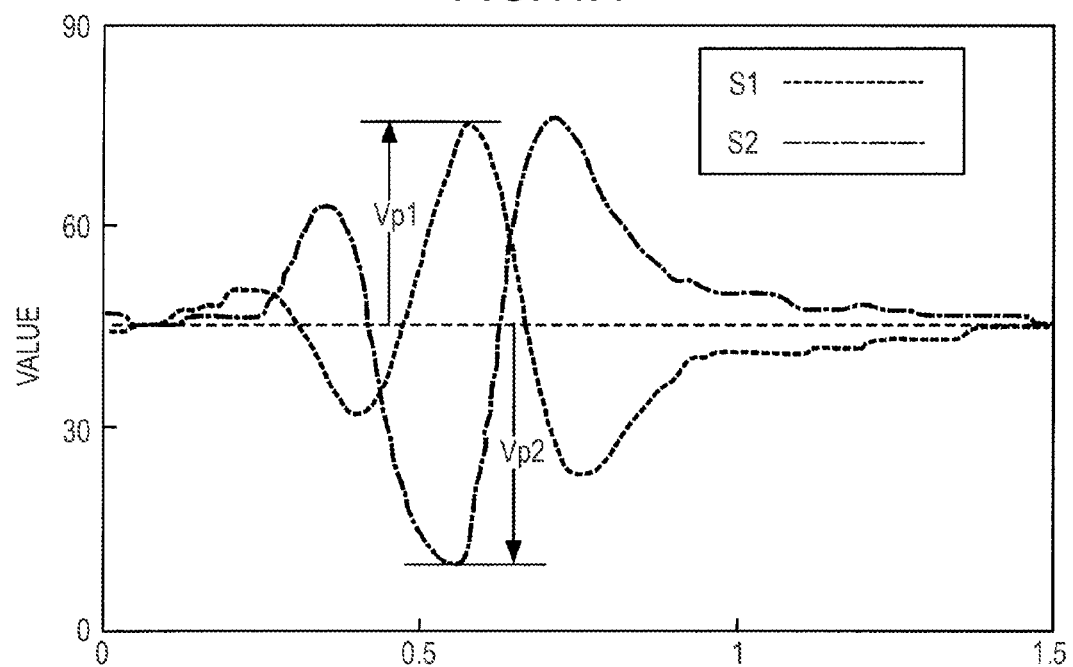
FIG. 11A and FIG. 11B are graphs for explaining normalization processing and phase plane mapping processing of sensor signals.

Here, assume that sensor signals S1, S2 shown in FIG. 11A were obtained. The sensor signals S1, S2 have actually been obtained by detecting the upward operation.

In the embodiment, normalization processing is performed with respect to the sensor signals S1, S2 obtained as described above.

As the normalization processing, first, a maximum value Vp1 in a significant period (gesture motion period) is found, in which amplitude has changed in accordance with detection of movement corresponding to the gesture motion in the sensor signal S1. The maximum value Vp1 is obtained as an absolute value. Then, amplitude values of the sensor signal S1 obtained in the same gesture motion period are divided by the maximum value Vp1. Accordingly, the amplitude values of the sensor signal S1 are normalized to be values shown by the ratio with respect to the maximum value Vp1 within a range of −1 to 1.

Also concerning the sensor signal S2, a maximum value Vp2 as an absolute value in the gesture motion period is found in the same manner, and amplitude values of the sensor signal S2 obtained in the same gesture motion period are divided by the maximum value Vp2. Accordingly, the amplitude values are normalized to be values shown by the ratio with respect to the maximum value Vp2 within a range of −1 to 1.

The pyroelectric sensor detects the temperature difference between the background and the object and outputs the amplitude value in accordance with the difference. However, the temperature of an operator's hand which will be actually an object varies. The temperature of the hand may significantly vary, for example, due to the fundamental difference of body temperature by constitution, or because the hand is wet or cold. Additionally, the amplitude of the detection signal is reduced as the distance from the operator's hand to the infrared detecting element becomes long. Accordingly, even when the same operation is performed by the operator, the size of amplitude of the sensor signals S1, S2 outputted from the one-dimensional sensors 40-1, 40-2 may vary every time because of effects of the temperature of a human hand, the distance from the hand and the like. Accordingly, it becomes significantly difficult to appropriately evaluate the following signal processing when variations of amplitude in the sensor signals S1, S2 remain though the signals are obtained in response to the same gesture.

Accordingly, in the embodiment, the amplitude values are converted into values within the range of −1 to +1 in accordance with the ratio with respect to the peak value (absolute value) by executing the above normalization processing. According to this, the sensor signals S1, S2 will have normal values from which variation factors of actual amplitudes are excluded.

The sensor signals S1, S2 having the normalized amplitude values are referred to a normalized sensor signal NOM_S1, a normalized sensor signal NOM_S2 respectively in the following description.

Following the normalization processing, processing of mapping the normalized sensor signal NOM_S1 and the normalized sensor signal NOM_S2 with respect to a phase plane (phase plane mapping processing) is performed.

Figure 11B:
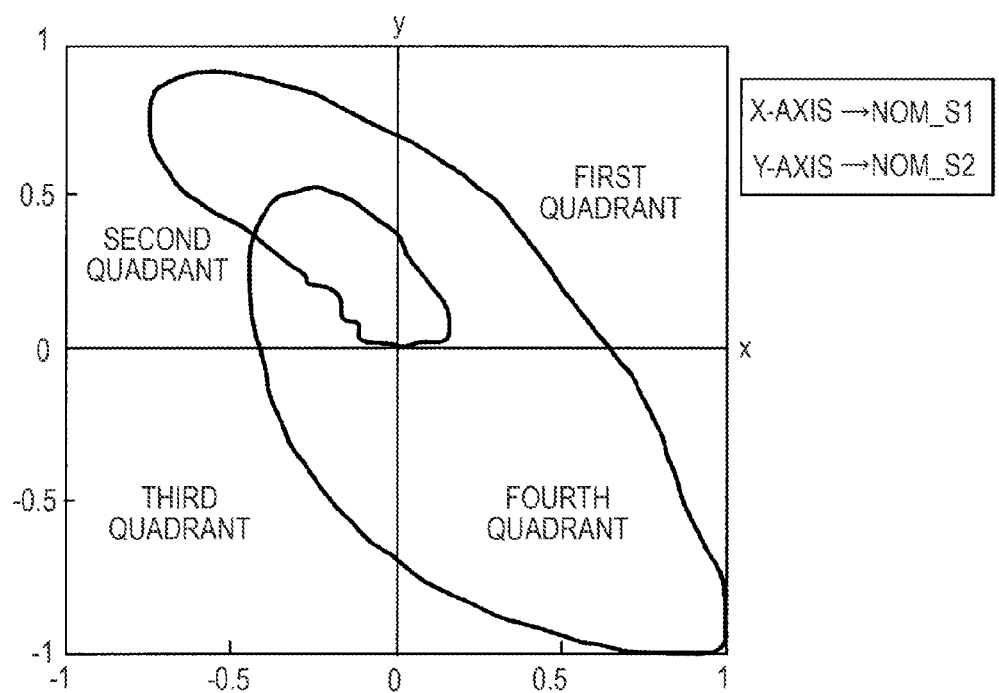

FIG. 11B shows a result obtained by executing the phase plane mapping processing using the normalized sensor signal NOM_S1 and the normalized sensor signal NOM_S2 corresponding to the sensor signals S1, S2 shown in FIG. 11A.

In the phase plane shown in FIG. 11B, x-coordinate corresponds to the normalized sensor signal NOM_S1 and y-coordinate corresponds to the normalized sensor signal NOM_S2. Both the x-coordinate and the y-coordinate have a coordinate range of −1 to +1.

The phase plane mapping processing in this case will be processing in which a value of the normalized sensor signal NOM_S1 is made to be an x-coordinate value and a value of the normalized sensor signal NOM_S2 is made to be a y-coordinate value which are obtained at the same timing, and coordinates are plotted on the phase plane in accordance with the time lapse in the sensor signals.

More specifically, in sample data of N-pieces of normalized sensor signals NOM_S1, NOM_S2 obtained in accordance with the gesture motion period, when values of i-th sample data is "xi", "yi", it will be processing of calculating all coordinates (xi, yi) corresponding to N-pieces of sample data.

Accordingly, a curve drawn on the phase plane of FIG. 11B indicates results of plotting the coordinates in accordance with the time lapse, namely, a track of plotted points. The curve as the track is also referred to as a signal track in the following description because it is based on the sensor signals S1, S2.

6-2. Determination of Gesture Motions in the Horizontal/Vertical Directions

FIG. 12A to FIG. 12C show examples of results of the phase plane mapping processing corresponding to rightward/leftward motions which are gesture motions in the horizontal direction.

FIG. 12A shows sensor signals S1, S2 obtained when performing the rightward motion and subsequently performing the leftward motion as gesture operations. A rightward motion detection period in the sensor signals S1, S2 in the drawing is a waveform section in which significant amplitudes can be obtained corresponding to the detection of the rightward motion, and a leftward motion detection period is a waveform section in which significant amplitudes can be obtained corresponding to the detection of the leftward motion.

As a result of executing the phase plane mapping processing using the normalized sensor signal NOM_S1, the normalized sensor signal NOM_S2 corresponding to the rightward motion detection period, a signal track on the phase plane shown in FIG. 12B can be obtained.

Also, as a result of executing the phase plane mapping processing using the normalized sensor signal NOM_S1, the normalized sensor signal NOM_S2 corresponding to the leftward motion detection period, a signal track on the phase plane shown in FIG. 12C can be obtained.

FIG. 13A to FIG. 13C show examples of results of the phase plane mapping processing corresponding to upward/downward motions which are gesture motions in the vertical direction.

FIG. 13A shows sensor signals S1, S2 obtained when performing the downward motion, and subsequently performing the upward motion which are horizontal gesture motions. A downward-motion detection period in the sensor signals S1, S2 in the drawing is a waveform section in which significant amplitudes can be obtained corresponding to the detection of the downward motion, and a upward-motion detection period is a waveform section in which significant amplitudes can be obtained corresponding to the detection of the upward motion.

As a result of executing the phase plane mapping processing using the normalized sensor signal NOM_S1, the normalized sensor signal NOM_S2 corresponding to the downward-motion detection period, a signal track on the phase plane shown in FIG. 13B can be obtained.

Also, as a result of executing the phase plane mapping processing using the normalized sensor signal NOM_S1, the normalized sensor signal NOM_S2 corresponding to the upward-motion detection period, a signal track on the phase plane shown in FIG. 13C can be obtained.

Next, in the embodiment, correlation coefficient of the signal track is calculated at first, a correlation coefficient "r" of the signal track is calculated as an evaluation item for determining whether the motion is the gesture motion corresponding to the horizontal direction (leftward motion/rightward motion) or whether the motion is the gesture motion corresponding to the vertical direction (upward motion/downward motion) based on the signal track obtained as the execution result of the phase plane mapping processing.

The correlation coefficient "r" can be calculated as follows.

$$r = \frac{\sum_{i=1}^{N}(x_i - \bar{x})(y_i - \bar{y})}{\sqrt{\sum_{i=1}^{N}(x_i - \bar{x})^2}\sqrt{\sum_{i=1}^{N}(y_i - \bar{y})^2}}$$

$x_i$: i-th sample value of NOM_S1
$y_i$: i-th sample value of NOM_S2
$\bar{x}$: arithmetic average of sample value of NOM_S1
$\bar{y}$: arithmetic average of sample value of NOM_S2

The signal tracks of the rightward motion and the leftward motion shown in the phase planes of FIG. 12B and FIG. 12C which correspond to gesture motions in the horizontal direction have common characteristics. For example, when an ellipse E is applied corresponding to a rough outline of the signal track, a straight line L corresponding to a major axis of the ellipse E slopes upward to the right both in the rightward motion and in the leftward motion. When the straight line L is seen as a straight line represented by a linear function y=ax+b, it will be a straight line of a>0.

The signal tracks of the upward motion and the downward motion shown in the phase planes of FIG. 13B and FIG. 13C which correspond to gesture motions in the vertical direction have also common characteristics, however, the characteristics are different from the FIG. 12B and FIG. 12C.

That is, the straight line L corresponding to the major axis of the ellipse E applied to the signal track in FIG. 13B and FIG. 13C slopes downward to the right both in the downward motion and the upward motion, and when the straight line L is seen as a straight line represented by a linear function y=ax+b, it will be a straight line of a<0.

The characteristics appear in accordance with the relationship of the polarity and mutual phases of the sensor signals S1, S2, which has been explained with reference to FIG. 10A to FIG. 10D.

According to the above, when the gradient of the straight line L obtained corresponding to the signal track slopes upward to the right, it is recognized that the gesture motion corresponds to the horizontal direction, and when it slopes downward to the right, it is recognized that the gesture motion corresponds to the vertical direction.

Positive/negative of the correlation coefficient "r" corresponds to upward sloping/downward sloping of the straight line L. The correlation coefficient "r" approximates to "+1" as the phase and amplitude of the sensor signals S1, S2 are closer, and the entire shape of the signal track also approximates to the upward-sloping straight line. On the other hand, the correlation coefficient "r" approximates to "−1" as the sensor signals S1, S2 approximates to the state of reverse phases in which the same waveform of each signal is inverted, and the shape of the signal track approximates to the downward-sloping straight line.

Specifically, when the correlation coefficients "r" of signal tracks shown in FIG. 12B and FIG. 12C are actually calculated, values of approximately −0.8 can be obtained.

On the other hand, when the correlation coefficients "r" of signal tracks shown in FIG. 13B and FIG. 13C are actually calculated, values of approximately −0.75 to −0.8 can be obtained.

As described above, in order to recognize in which direction of the horizontal direction and the vertical direction the gesture motion is performed, the correlation coefficient "r" with respect to the normalized sensor signals NOM_S1, NOM_S2 is calculated in the embodiment. As a result of calculation, the algorithm may be configured so that, when the correlation coefficient "r" is larger than "0", the gesture motion is recognized as the motion in the horizontal direction, and when the correlation coefficient "r" is smaller than "0", the gesture motion is recognized as the motion in the vertical direction.

In the embodiment, when the absolute value of the correlation coefficient "r" is lower than a fixed value, the probability that the detected gesture motion corresponds to a turning motion is higher as will be described later. Therefore, when the embodiment is actually performed, it is preferable to determine to which of gesture motions in horizontal/vertical directions and turning motions the detected motion belongs after calculating the correlation coefficient "r". This will be described later.

6-3. Determination of Direction in Left/Rightward Motions and Direction in Upward/Downward Motions As described above, it is possible to determine in which direction of the horizontal direction and the vertical direction the gesture motion is performed based on the correlation coefficient "r" indicating the degree of correlation between the normalized sensor signals NOM_S1, NOM_S2 on the phase plane.

Then, when it is determined that the gesture motion is performed along the horizontal direction, it is necessary to recognize whether the gesture motion is the leftward motion or rightward motion. Also, when it is determined that the gesture motion is performed along the vertical direction, it is necessary to recognize whether the gesture motion is the upward motion or the downward motion.

Here, FIG. 12A to FIG. 12C which correspond to gesture motions in the horizontal direction are used as reference again.

In the ellipse E corresponding to the signal track formed by the rightward motion shown in FIG. 12B, the straight line L has a gradient sloping upward to the right as well as biased to the first quadrant with respect to the origin.

On the other hand, in the ellipse E corresponding to the signal track formed by the leftward motion in FIG. 12C, the straight line L also has the gradient sloping upward to the right, however, it is biased to the third quadrant with respect to the origin in the reverse manner to FIG. 12B.

The difference of bias according to the rightward motion and the leftward motion appears in accordance with the fact that signals in a pair of the sensor signals S1, S2 corresponding to each motion are in phase, and the sensor signals S1 in respective motions and the sensor signals S2 in the respective portions are out of phase when comparing between the rightward motion and the leftward motion as shown in FIG. 10A and FIG. 10B.

Concerning the gesture motions in the vertical direction, signals in a pair of the sensor signals S1, S2 corresponding to each motion of the upward motion and the downward motion are out of phase, as well as the sensor signals S1 in respective motions and the sensor signals S2 in respective motions are out of phase when comparing between the upward motion and the downward motion as shown in FIG. 10C and FIG. 10D.

According to the phase relation described above, first, in the ellipse E corresponding to the signal track formed by the downward motion, the straight line L has a gradient sloping downward to the right as well as biased to the second quadrant with respect to the origin as shown in FIG. 13B. On the other hand, in the ellipse E corresponding to the signal track formed by the upward motion, the straight line L has a gradient sloping downward to the right as shown in FIG. 13C as well as biased to the fourth quadrant with respect to the origin in the reverse manner to FIG. 13B.

According to the above, first, in the gesture motions in the horizontal direction, the general shape (ellipse E) as the signal track indicates the rightward motion when it is biased to the first quadrant on the phase plane and the ellipse E indicates the leftward motion when it is biased to the third quadrant.

Similarly, in the gesture motions in the vertical direction, the general shape (ellipse E) as the signal track indicates the downward motion when it is biased to the second quadrant in the phase plane and the ellipse E indicates the upward motion when it is biased to the fourth quadrant.

Accordingly, in the embodiment, in order to evaluate to which quadrant the general shape (ellipse E) of the signal track is biased, a barycenter G of the signal track on the phase plane mapping is calculated.

The barycenter G is calculated as coordinates G (gx, gy).

In FIG. 12B, FIG. 12C, FIG. 13B and FIG. 13C, the coordinates G is shown as a mid-point of the major axis of the ellipse E as the straight line L. However, the coordinates G are schematically shown, and the actual coordinates G to be calculated does not always correspond to the straight line L.

Here, some methods of calculating an x-coordinate gx, a y-coordinate yx of the barycenter G can be considered. As one of the methods, an arithmetic average value with respect to the normalized sensor signals NOM_S1, NOM_S2 is calculated. An arithmetic expression in this case will be, for example, as follows.

$$g_x = \frac{1}{N}\sum_{i=1}^{N} x_i \quad , \quad g_y = \frac{1}{N}\sum_{i=1}^{N} y_i$$

The barycenter G (gx, gy) indicates the position of the barycenter in the general shape as the signal track. Therefore, the direction of bias with respect to the origin in the general shape of the signal track is shown by the direction of the barycenter (gx, gy) from the origin on the phase plane. According to this, the barycenter G (gx, gy) can be used as an evaluation value for recognizing the motion direction in the respective horizontal and vertical directions.

That is to say, as an algorithm, it can be recognized that, in the case of the gesture motions in the horizontal direction, the motion is the rightward motion when the barycenter G (gx, gy) is positioned at the first quadrant, and the motion is the leftward motion when the barycenter G (gx, gy) is positioned at the third quadrant. Also, in the case of the gesture motions in the vertical direction, when the barycenter G (gx, gy) is positioned at the second quadrant, the motion is recognized as the downward motion, and when the barycenter G (gx, gy) is positioned at the fourth quadrant, the motion is recognized as the upward motion.

Here, the correlation coefficient "r" to be calculated in the embodiment is an evaluation value for determining to which of the motion in the vertical direction and the motion in the horizontal direction the gesture motion belongs. That is, it is an evaluation value for evaluating whether the sensor signals S1, S2 obtained by motion detection are in phase or out of phase.

The barycenter position G (gx, gy) is an evaluation value for determining whether the gesture motion in the horizontal direction is the leftward motion or the rightward motion as well as determining whether the gesture motion in the vertical direction is the upward motion or the downward motion. That is, the barycenter G can be regarded as a value for evaluating the polarity (waveform pattern) of the sensor signals S1, S2 themselves.

As methods of evaluating and determining the phase difference between the sensor signals S1, S2 and the polarity of the sensor signals S1, S2 themselves, the following methods are generally conceivable.

That is, the maximum values and the minimum values of amplitudes of the sensor signals S1, S2 are calculated first. Then, whether the time difference between the two calculated maximum values and the minimum values are within a threshold value or not is determined. The threshold value is set based on, for example, amplitude values of the sensor signals S1, S2 obtained in accordance with the gesture motion generally and ordinarily. Whether the sensor signals S1, S2 are in phase or output phase is determined by the time difference of peak values between the sensor signals S1, S2. Also, the order of appearance of the maximum values and the minimum values of the sensor signals S1, S2 is determined, thereby determining the polarity of signals.

In the arrangement of the one-dimensional sensors 40-1, 40-2 shown in FIG. 8A and FIG. 8B, extremely stable sensor signals S1, S2 can be obtained as compared with the case of FIG. 6A and FIG. 6B. However, the gesture motion is actually performed by hand movement of the user as a human, therefore, movement speed is not constant and tremor of the hand with respect to the detection axis occurs. The sensor signals S1, S2 generate variations in the amplitude and the phase to a certain degree due to effects of uncertainty. When the time difference between peak values of the sensor signals S1, S2 as the evaluation is compared with the fixed threshold value despite of such variation factors, it is difficult to obtain determination results having high reliability.

In the embodiment, the phase plane mapping is performed after the normalization processing concerning the sensor signals S1, S2 is performed first, then, the coordinates of the correlation coefficient "r" and the barycenter position G are calculated. The correlation coefficient "r" and the barycenter position G have higher faithfulness as evaluation values for the phase difference and the polarity between the sensor signals S1, S2 as compared with, for example, the time difference between peaks described above. That is, according to the embodiment, it is possible to obtain results of recognition gesture motions of up and down, left and right with higher accuracy than before.

6-4. Determination of Left/Right Turning Motions

In the embodiment, turning motions in which an object moves so as to draw a circular movement track can be recognized based on the signal track formed by the phase plane mapping processing. Accordingly, as explained with reference to FIG. 1, the embodiment includes a right-turning motion and a left-turning motion as gesture motions in addition to the motions of up and down, left and right.

Subsequently, a method of recognizing the turning motions in the embodiment will be explained.

Figure 14A:
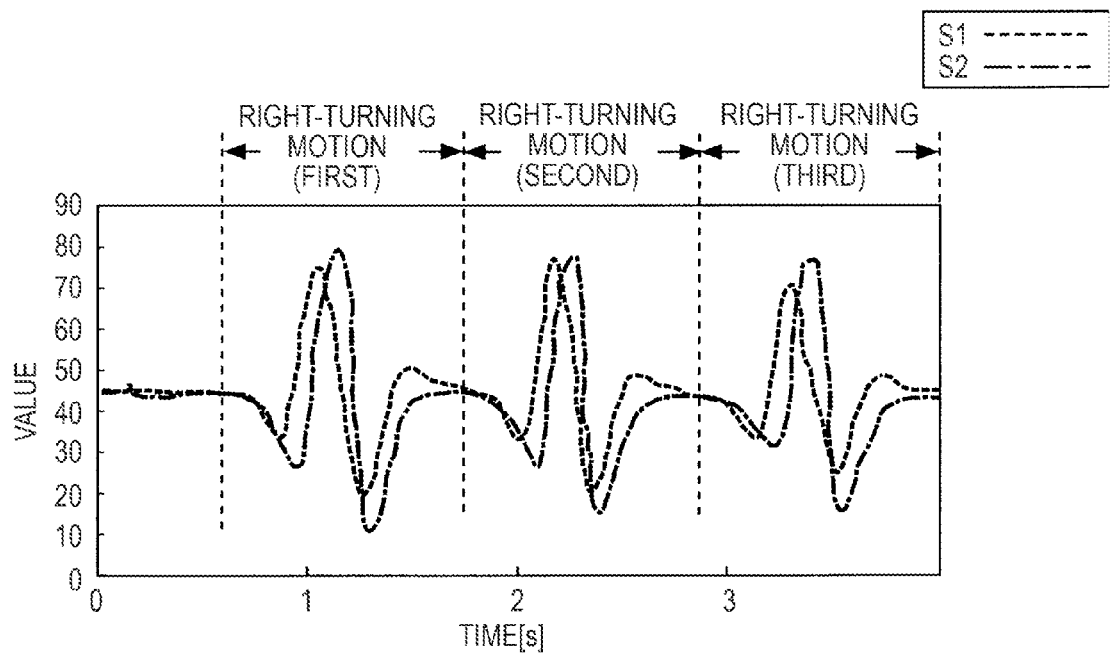
FIG. 14A and FIG. 14B are graphs showing examples of sensor signals and signal tracks on the phase plane obtained corresponding to a right turning.

FIG. 14A shows waveform examples of sensor signals S1, S2 outputted in accordance with the gesture motion as the right-turning motion performed continuously three times.

In the sensor signals S1, S2 shown in the drawing, both waveforms obtained by one turning motion have the polarity in which absolute values of the peaks of the M-shape are on the positive-polarity side as well as the phase of the sensor signal S2 is advanced with respect to the phase of the sensor signal S1.

Figure 14B:
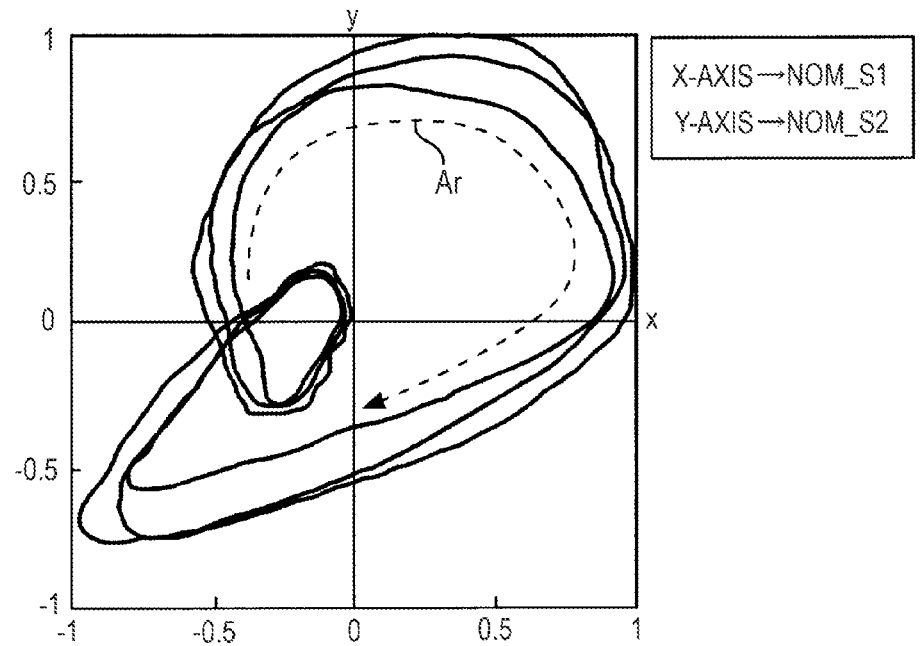

Results obtained by normalizing the sensor signals S1, S2 in FIG. 14A and performing the phase plane mapping processing are shown in FIG. 14B.

In the case of gesture motions of up and down, left and right, the sensor signals S1, S2 have the relation in the phase difference which can be regarded as in-phase (0 degree) or out-of phase (180 degrees), however, in the case of turning operations, the phase difference smaller than 180 degrees occurs in the sensor signals S1, S2 as shown in FIG. 14A. Accordingly, an absolute value of the correlation coefficient "r" will be smaller than the value in the case of gesture operations of up and down, left and right. That is, when signals are seen as the shape of the signal track, the track approximates to the circular shape as shown in FIG. 14B as compared with the case of gesture operations of up and down, left and right. That is, the ratio between the major axis and the minor axis of an ellipse approximates to 1.

Therefore, as a method of determining whether the gesture motion is the turning operation or not, the easiest method is to determine whether the absolute value of the correlation coefficient "r" is a small value to a degree that the value is obtained in accordance with the turning motion, namely, smaller than a fixed value.

According to the above, attention is focused here on the turning direction of the signal track on the phase plane when sample values are plotted in accordance with time lapse of the sensor signals S1, S2 by the phase plane mapping processing. Then, a track is formed so as to turn in the right direction (clockwise direction) as shown in an arrow Ar as the entire signal track shown in FIG. 14B.

The turning direction of the signal track is determined by the phase difference between the sensor signals S1, S2. That is, the phase of the sensor signal S2 is advanced with respect to the phase of the sensor signal S1 in FIG. 14A, therefore, the turning direction of the signal track will be the right direction.

Figure 15A:
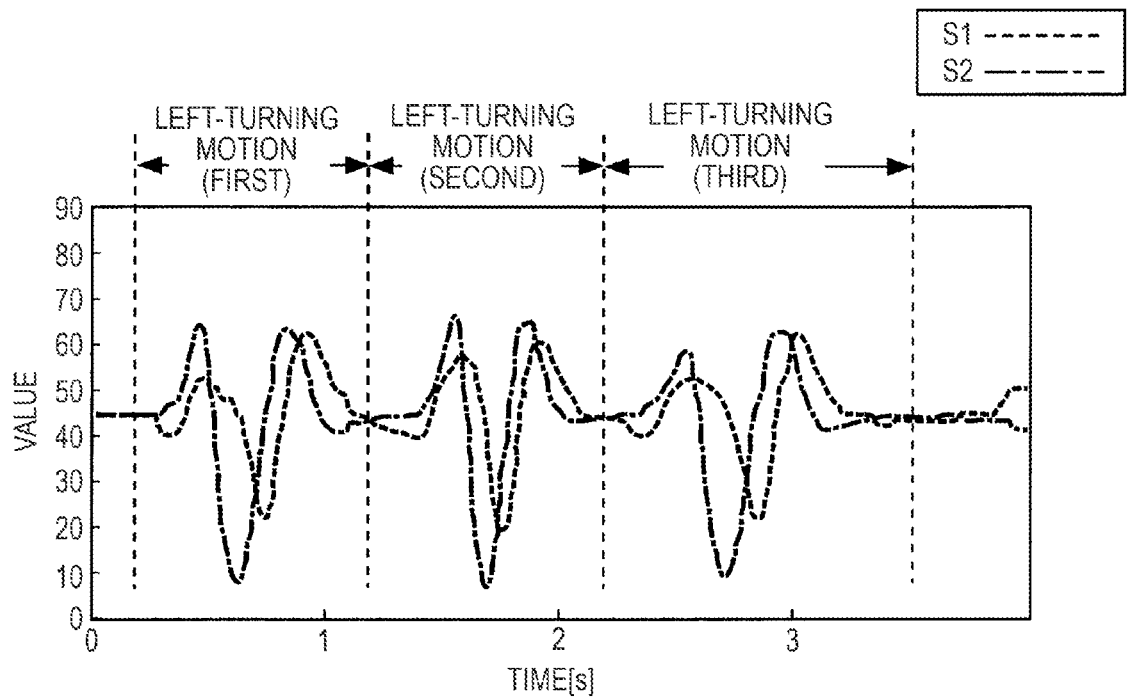
FIG. 15A and FIG. 15B are graphs showing examples of sensor signals and signal tracks on the phase plane obtained corresponding to a left turning.

On the other hand, FIG. 15A shows waveform examples of sensor signals S1, S2 outputted in accordance with the gesture motion as the left-turning motion performed continuously three times.

In the sensor signals S1, S2 shown in the drawing, both waveforms obtained by one turning motion have the polarity in which absolute values of the peaks of the M-shape are on the negative-polarity side as well as the phase of the sensor signal S2 is delayed with respect to the phase of the sensor signal S1. That is, the relation of phase difference between the sensor signals S1, S2 is inverse to the case of FIG. 14A.

Figure 15B:
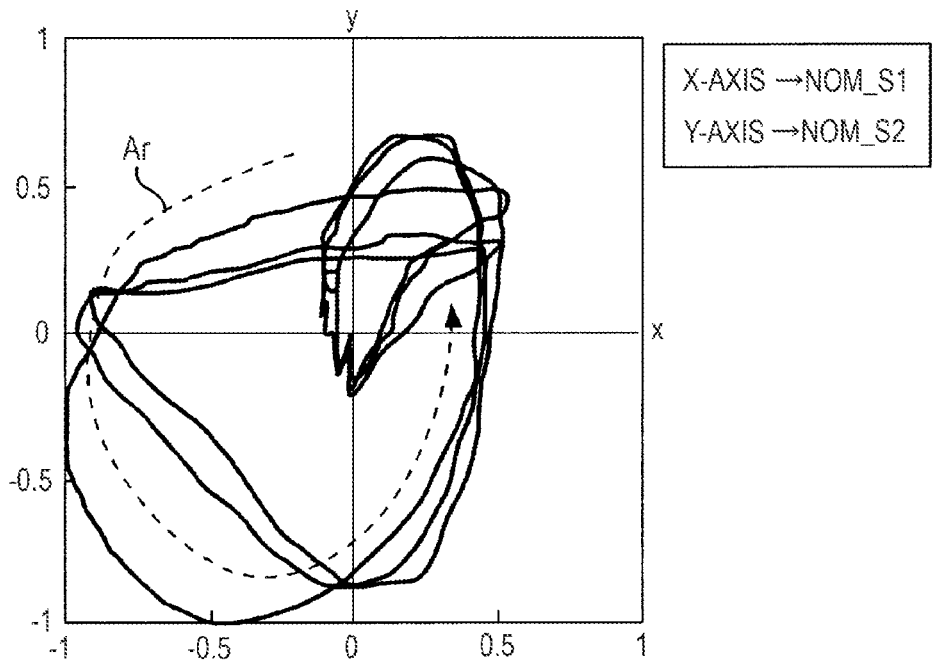

According to the above, the signal track obtained when the phase plane mapping processing is performed by normalizing the sensor signals S1, S2 of FIG. 15A is a track turning in the left direction (counterclockwise direction) as shown by an arrow Ar of FIG. 15B.

Consequently, in the case that the gesture motion is recognized as the gesture motion along the turning motion, for example, because the correlation coefficient "r" is lower than a fixed value, in order to further determine whether the turning direction (plot turning direction) is direction of the right-turning motion or direction of the left-turning motion, it is appropriate to apply the following algorithm.

That is, whether the turning direction of the formed signal track is right turning or left turning as the whole trend is calculated. When the turning direction of the obtained signal track is right-turning, the gesture motion is determined as the right-turning motion and when the turning direction of the signal track is left-turning, the gesture motion is determined as the left-turning motion.

It is necessary to determine whether the direction of the signal track is right-turning direction or left-turning direction as signal processing.

Accordingly, in the embodiment, cross products of respective coordinates forming the signal track are calculated. Here, the cross product formed by the x-axis and the y-axis in the two-dimensional plane has only a component of the z-axis direction (z-component) which is orthogonal to the two axes, and the x-direction component and the y-direction component will be "0". The whole trend of the turning direction of the signal track can be calculated according to whether the sign of the sum of z-components of cross products is positive or negative.

Figure 16A:
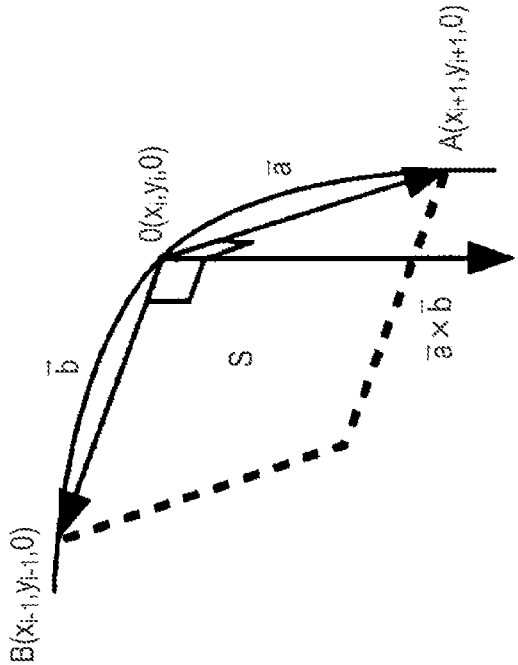
FIG. 16A and FIG. 16B are views for explaining cross products of vectors.
Figure 16B:
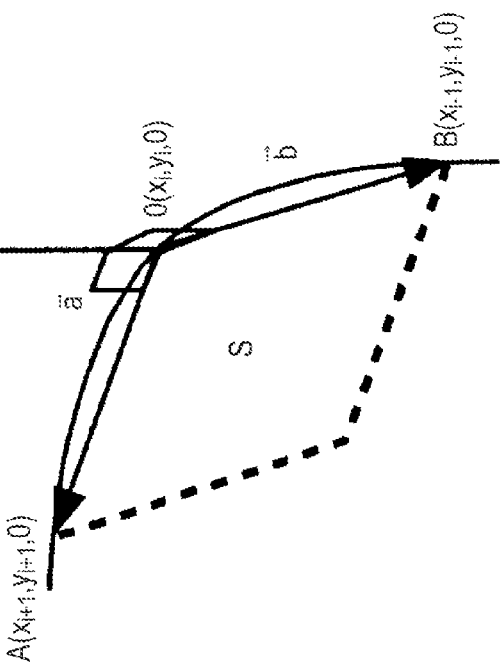

Here, the relation between the turning directions of the signal track and the cross products is shown in FIG. 16A and FIG. 16B.

First, FIG. 16A shows
coordinates "0" (xi, yi, 0) plotted by samples of the i-th normalized sensor signals NOM_S1, NOM_S2 on the phase plane,
coordinates A (xi+1, yi+1, 0) plotted by samples of the i+1th normalized sensor signals NOM_S1, NOM_S2 on the phase plane,
coordinates B (xi−1, yi−1, 0) plotted by samples of the i−1th normalized sensor signals NOM_S1, NOM_S2 on the phase plane.

Moreover, as the positional relationship of these coordinates on the two-dimensional plane, a state in which the coordinates A (xi+1, yi+1, 0) are positioned at the left side of the coordinates "0" (xi, yi, 0), and the coordinates B (xi−1, yi−1, 0) is positioned at the right side thereof is shown.

Here, assume that the direction and distance from the coordinates "0" (xi, yi, 0) as a start point to the coordinates A (xi+1, yi+1, 0) is represented by a vector "a", and the direction and distance from the coordinates "0" (xi, yi, 0) as a start point to the coordinates B (xi−1, yi−1, 0) is represented by a vector "b". Then, when a cross product between the vectors "a", "b" is calculated, a positive value is obtained as a value of the z-component at this time. As an absolute value of the cross product of the vectors "a", "b" represents an area S of a parallelogram formed by segments corresponding to the vectors "a", "b" shown in FIG. 16A as adjacent edges.

FIG. 16B shows a case in which the position of the coordinates A (xi+1, yi+1, 0) and the position of the coordinates B (xi−1, yi−1, 0) are replaced in the coordinates "0" (xi, yi, 0), A (xi+1, yi+1, 0) and B (xi−1, yi−1, 0) in FIG. 16A. The absolute value of a cross product of vectors "a", "b" is equal to the value of FIG. 16A. That is, the absolute value represents the area S of the parallelogram. However, the sign of the z-component will be negative.

In the embodiment, cross products of respective sample timings of the sensor signals S1, S2 are calculated in accordance with FIG. 16A and FIG. 16B, and further the sum of the calculated cross products is calculated. A sum value "p" of cross products can be calculated by the following manner.

$$p = \sum_{i=1}^{N} \{(x_{i+1} - x_i) \cdot (y_{i-1} - y_i) - (y_{i+1} - y_i) \cdot (x_{i-1} - x_i)\}$$

Then, the whole trend of the turning direction of the signal track is determined according to whether the sign of the sum value "p" of z-components of the calculated cross products is positive or negative. That is, whether the gesture motion is the left-turning motion or the right-turning motion is recognized.

When calculation is made by following FIG. 16A and FIG. 16B, the whole trend of the turning direction of the signal track is determined to be the left-turning in the case that the sign of the sum value "p" of z-components of cross products is positive. That is, the gesture motion is determined as the left-turning motion. Also, the whole trend of the turning direction of the signal track is determined to be the right-turning in the case that the sign of the sum value "p" of z-components of cross products is negative. That is, the gesture motion is determined as the right-turning motion.

7. Algorithm for Determining Gesture Motions

An algorithm example for realizing determination of gesture motions according to the embodiment which has been described above will be explained.

Figure 17:
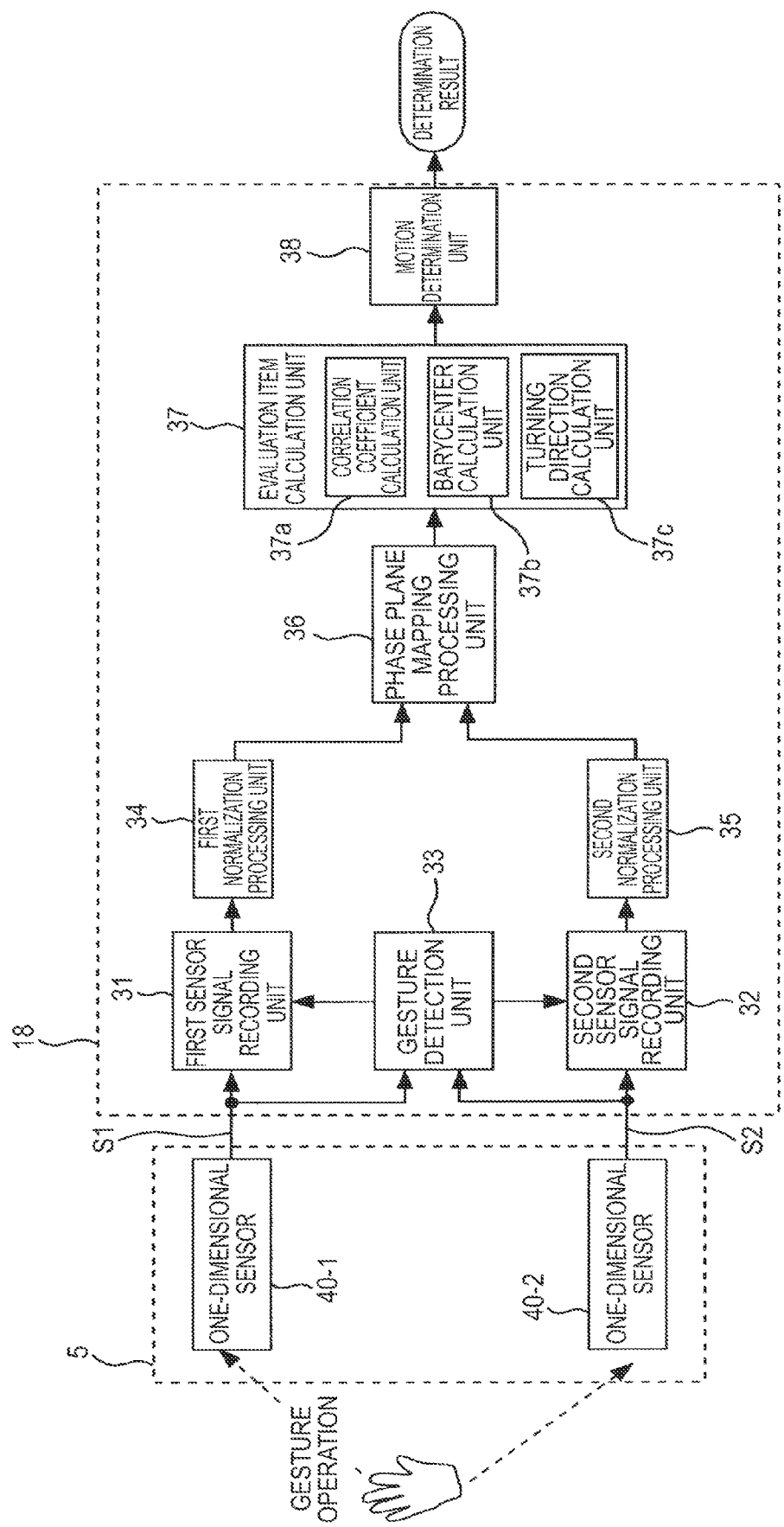
FIG. 17 is a block diagram showing a configuration example of a gesture motion determination unit.

First, FIG. 17 shows a configuration example of a gesture motion determination unit 18 of the photo frame display device 1 of the embodiment in a block configuration. The gesture motion determination unit 18 is realized by the control unit 11 executing the program as shown in FIG. 2. The sensor unit 5 including the one-dimensional sensors 40-1, 40-2 is also shown in the drawing in addition to the gesture motion determination unit 18.

The sensor signal S1 outputted from the one-dimensional sensor 40-1 is inputted by a first sensor signal recording unit 31 and a gesture detection unit 33 in the gesture motion determination unit 18. The sensor signal S2 outputted from the one-dimensional sensor 40-2 is inputted by a second signal recording unit 32 and a gesture detection unit 33 in the gesture motion determination unit 18.

The sensor signals S1, S2 in a stage of being inputted to the gesture motion determination unit 18 have been converted into digital signals sampled by a given sampling frequency and the quantifying bit number, though not shown.

The gesture detection unit 33 is a unit for detecting the gesture motion period based on the sensor signals S1, S2 to be inputted. The processing of the gesture detection unit 33 will be described later by a flowchart of FIG. 19. The gesture detection unit 33 notifies start/end of the detected gesture motion to the first sensor signal recording unit 31 and the second sensor signal recording unit 32.

The first signal recording unit 31 and the second sensor recording unit 32 record data at respective sampling timings by taking the sensor signals S1, S2 respectively in the gesture motion period notified by the gesture detection unit 33.

The sample data of the sensor signal S1 recorded by the first sensor signal recording unit 31 is outputted to a first normalization processing unit 34.

The first normalization processing unit 34 executes normalization processing with respect to the sensor signal S1 to obtain the sample data group of the normalized sensor signal NOM_S1 normalized within the range of −1 to +1 as described in FIG. 11A and FIG. 11B.

Similarly, the second normalization processing unit 35 also executes normalization processing by taking sample data of the sensor signal S2 recorded by the second sensor signal recording unit 32 to obtain the sample data group of the normalization sensor signal NOM_32 normalized within the range of −1 to +1.

The sample data groups of the normalization sensor signals NOM_S1, NOM_S2 are transmitted to a phase plane mapping processing unit 36.

The phase plane mapping processing unit 36 calculates data of a signal track obtained by plotting the sample data groups of the inputted normalized sensor signals NOM_S1, NOM_S2 on the phase plane as described in FIG. 11A and FIG. 11B, and transmitting the data to an evaluation item calculation unit 37. The signal track data will be values (a pair of the normalized sensor signal NOM_S1 and NOM_32) of coordinates (xi, yi) plotted on the phase plane so as to correspond to each sample number "i".

The evaluation item calculation unit 37 includes a correlation coefficient calculation unit 37a, a barycenter calculation unit 37b and a turning direction calculation unit 37c.

The correlation coefficient calculation unit 37a executes processing of calculating the data correlation coefficient "r" of the signal track by using the received signal track data (data of the normalized sensor signals NOM_S1, NOM_S2 at respective sample timings) by calculation previously explained by "Expression 1").

The barycenter calculation unit 37b calculates the coordinates G (gx, gy) of the barycenter, for example, by calculation previously explained by "Expression 2" using the signal track data.

The turning direction calculation unit 37c calculates the sum value "p" of z-coordinates of cross products calculated with respect to respective samples of the signal track as previously explained by FIG. 16 and FIG. 16B and "Expression 3".

A motion determination unit 38 executes processing of determining to which of the leftward motion, the rightward motion, the upward motion, the downward motion, the left-turning motion and right-turning motion the gesture motion corresponds by appropriately using the correlation coefficient "r", the barycenter coordinates G (gx, gy) and the sum value "p" of z-components of cross products which can be obtained by the evaluation item calculation unit 37, and outputs the determination result.

The control unit 11 processes the determination result of the gesture motion outputted by the gesture motion determination unit 18 as an operation command to thereby execute control so as to obtain an appropriate operation as the photo frame display device 1 which has been cited an example.

Figure 18:
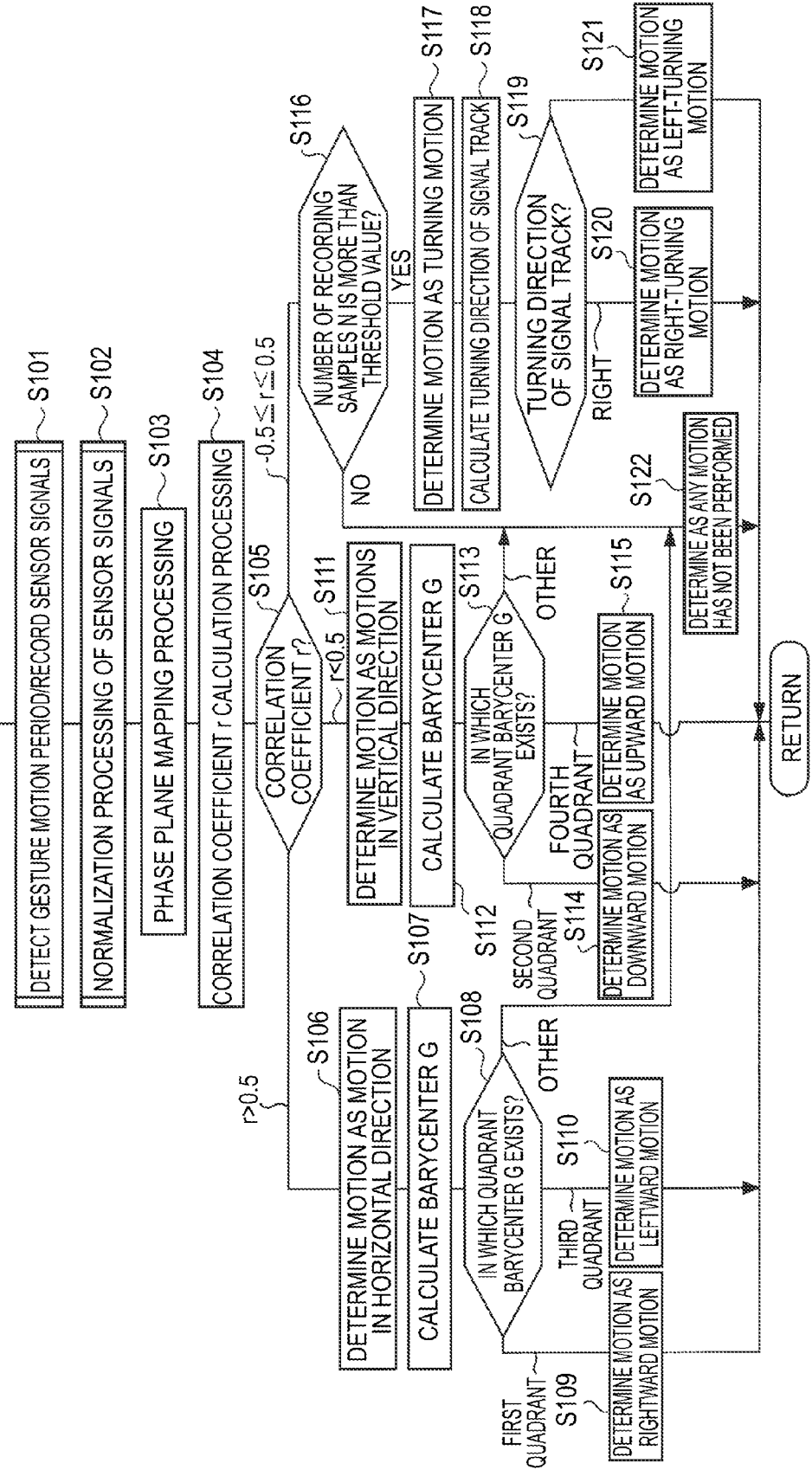
FIG. 18 is a flowchart showing a processing procedure example executed by the gesture motion determination unit.

FIG. 18 shows an example of processing procedures executed by the gesture motion determination unit 18 shown in FIG. 17 as a flowchart.

In the drawing, processing of recording sensor signals by detecting a gesture motion period in Step S101 first. The processing shown in the drawing is executed by the gesture detection unit 33, the first sensor signal recording unit 31 and the second sensor signal recording unit 32.

Figure 19:
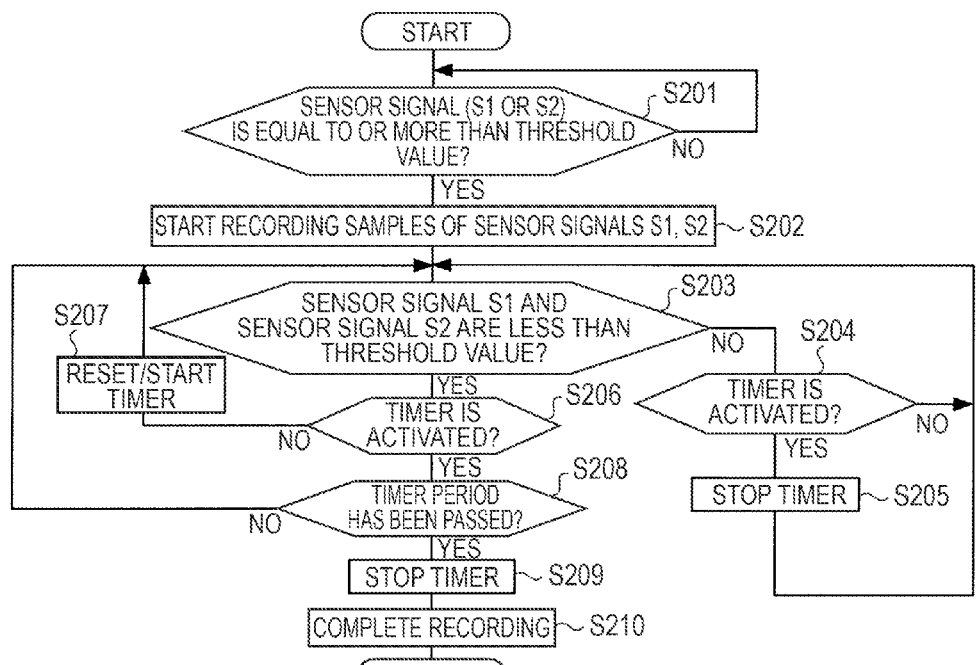
FIG. 19 is a flowchart showing a processing procedure example for detecting a gesture motion period and recording samples in accordance with the detection.

An example of processing procedures of Step S101 will be shown by a flowchart of FIG. 19.

In Step S201 of FIG. 19, first, the gesture detection unit 33 inputs the sensor signals S1, S2 to compare them with a threshold value. The threshold value in this case can be determined based on the amplitude of the sensor signal obtained when the one-dimensional sensor 40-1 detects a motion which may be the gesture motion. In this case, the sensor signals S1, S2 inputted by the one-dimensional sensors 40-1, 40-2 are compared with the threshold value as they are, however, it is also preferable that normalized sensor signals S1, S2 (which may be the same as NOM_S1, NOM_S2) and the values of the normalized sensor signals S1, S2 are compared with the threshold value.

In Step S201, it is necessary to wait for at least one of level values (sample values) of the sensor signals S1, S2 to be equal to or more than the threshold value. Then, when an affirmative determination result is obtained in Step S201, the process proceeds to procedures after Step S202. For example, for the correspondence with FIG. 17, the gesture detection unit 33 notifies start of the gesture motion to the first sensor signal recording unit 31 and the second sensor signal recording unit 32 in response to the affirmative determination result is obtained in Step S201.

In Step S202, sample data of the sensor signals S1, S2 is started to be recorded by the first sensor signal recording unit 31 and the second sensor signal recording unit 32. That is, the recording of the sensor signals S1, S2 is started in response to the notification of the gesture motion start by the gesture motion detection unit 33.

The gesture detection unit 33 in this case can be regarded as a unit of detecting the start timing of the gesture motion by obtaining the affirmative determination result in Step S201. The gesture detection unit 33 should detect the end timing of the gesture motion after that. In this case, after both the sensor signals S1, S2 become less than the threshold value from a state in which at least one of the sensor signals S1, S2 is equal to or more than the threshold value, the end timing of the gesture motion is detected at a point when a given period of time has passed after the signals are becomes in the state of less than the threshold. The processing after Step S203 will be the processing for detecting the end timing of the gesture motion.

Step S203 is executed by the gesture detection unit 33. When the affirmative determination result is obtained in Step S201, at least one of the sensor signals S1, S2 is equal to or more than the threshold value. In Step S203 performed after that, the gesture detection unit 33 determines whether both the sensor signals S1, S2 are less than the threshold value or not at present.

When a negative determination result is obtained in Step S203, it is determined whether a timer is activated or not in Step S204. The timer is reset/started in Step S207 explained next, which counts time from a point when the sensor signals S1, S2 become less than the threshold value until the point regarded as the end point of the gesture motion. When the negative determination result is obtained as the timer is not activated in Step 204, the process returns to Step S203. When the timer is activated, the timer is stopped in Step S205 and the process returns to Step S203.

When an affirmative determination result is obtained in Step S203, first, it is determined whether the timer is activated or not in Step S206. When the timer is not activated, the count value of the timer is reset in Step S207 to start the counting, then, the process proceeds to Step S203.

On the other hand, when an affirmative determination result is obtained as the timer is activated in Step S206, the process proceeds to Step S208.

In Step S208, whether a timer period has been passed is determined based on the present count value of the timer. When a negative determination result is obtained as the timer period has not been passed, the process returns to Step S203. On the other hand, when an affirmative determination result is obtained as the timer period has been passed, the process proceeds to Step S209 and counting of the timer is stopped. The fact that the determination result is obtained as the timer period has passed in Step S208 corresponds to processing of notifying that the gesture motion period has ended by the gesture detection unit 33.

In Step S210, the second sensor signal recording unit 31 and the second sensor signal recording unit 32 complete the recording of sample data of the sensor signals S1, S2 until then in accordance with the end of the gesture motion period.

In FIG. 18, after the processing of Step S101 has been executed, processing of Step S102 will be executed. In Step S102, the first normalization processing unit 34 and the second normalization processing unit 35 execute normalization processing with respect to sample data of the sensor signals S1, S2 recorded by the first sensor signal recording unit 31 and the second sensor signal recording unit 32.

The normalization processing has been previously explained with reference to FIG. 11A and FIG. 11B, and an example of processing procedures is shown as a flowchart of FIG. 20. As the flow of steps of the flowchart, first, the normalization processing is performed with respect to the sensor signal S1, then, the normalization processing is performed with respect to the sensor signal S2.

First, in Step S301, "1" is substituted in "m" which is a variable corresponding to a sensor signal Sm obtained by generalizing the sensor signals S1, S2.

Next, in Step S302, the maximum value $Sm_{max}$ in the sample data of the sensor signal Sm is acquired. The maximum value $Sm_{max}$ corresponds to any of the maximum values Vp1, Vp2 (absolute values) of the sensor signal S1 or the sensor signal S2 explained with reference to FIG. 11A.

In Step S303, "1" is substituted as an initial value in "i" representing the number of sample data of the sensor signal Sm.

In subsequent Step S304, the i-th sample data in the sensor signal Sm is normalized.

As processing for the normalization, for example, assume that the normalized value of the i-th sample data in the sensor signal is NOM_Sm_i and the i-th sample data in the sensor signal Sm is Sm_i, the calculation represented by the following expression is performed.

$$NOM\_Sm\_i = Sm\_i/Sm\text{MAX} \quad \text{(Expression 1)}$$

That is, the value of the sample data of the sensor signal is divided by the maximum value (absolute value) of the same sensor signal Sm as described above.

In Step S305, whether the variable "i" is the maximum value or not is determined. The maximum value corresponds to each sample number N of the sensor signals S1, S2 recorded corresponding to the gesture motion period.

When a negative determination result is obtained here, it means that there remains a sample the normalized value of which has not acquired yet. Accordingly, the variable "i" is incremented in Step S306 and the process returns to Step S304. Accordingly, the normalized value can be sequentially obtained with respect to the sample data.

Then, when the normalization processing of the last sample data of the sensor signal Sm has ended, an affirmative determination result is obtained in Step S305, and the process proceeds to Step S307. In Step S307, whether the variable 'm' is the maximum value or not is determined. For the correspondence with the above explanation, there are two sensor signals S1, S2, therefore, the maximum value of the variable "m" is 2.

When a negative determination result is obtained in Step S307, it means that there remains a sensor signal to which the normalized processing has not performed yet. Accordingly, the variable "m" is incremented in Step S308 in this case and the process returns to Step S302. According to this, the normalization processing is started with respect to another sensor signal.

Then, for example, the normalization processing has been completed with respect to the sensor signals S1, S2, an affirmative result is obtained in Step S307, and the normalization processing of the sensor signals in Step S102 is completed.

The normalization values NOM_Sm_i of the sample data are arranged in the order of samples in time series with respect to the sensor signals S1, S2 can be regarded as the normalized sensor signals NOM_S1 and the normalized sensor signals NOM_S2 described above.

Figure 20:
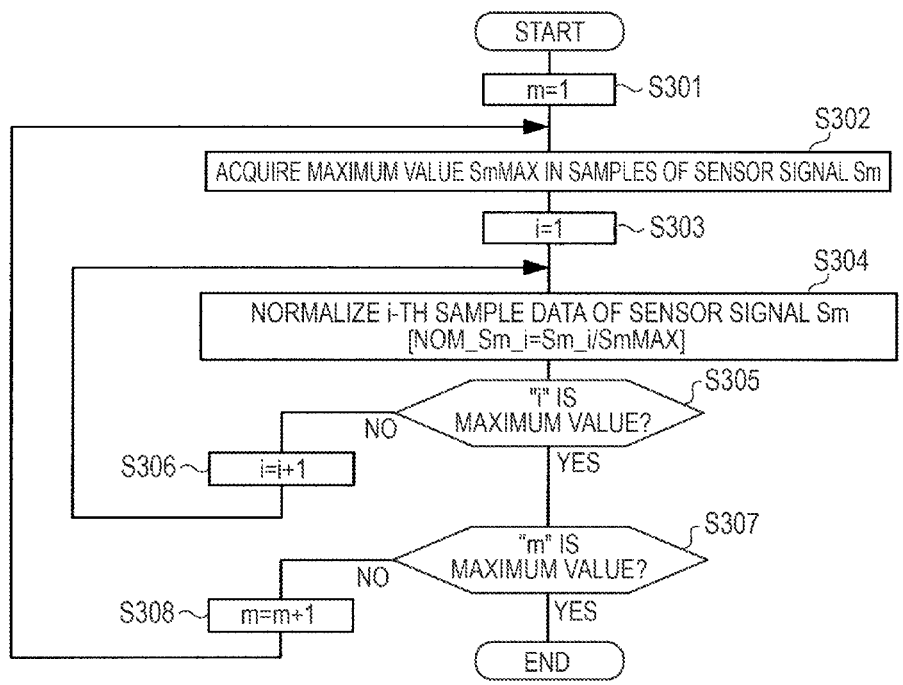
FIG. 20 is a flowchart showing normalization processing.

In the processing of FIG. 20, as procedures in which the normalization processing is performed with respect to the sensor signals S1, S2, first, an algorithm in which the sensor signal S1 is processed first and the sensor signal S2 is sequentially processed is applied as described above. However, it is actually preferable to apply an algorithm in which the normalization processing of the sensor signals S1, S2 is executed approximately at the same time as the parallel processing so as to correspond to the block configuration show in FIG. 17.

The explanation is returns to FIG. 18.

After the normalization processing as Step S102 is executed, the phase plane mapping processing unit 36 executes phase plane mapping processing in Step S103 by using data of the normalization values of the sensor signals S1, S2 (normalized sensor signals NOM_S1, normalized sensor signals NOM_S2) obtained in Step S102. According to this, the phase plane mapping processing unit 36 acquires data of the signal track.

In Step S104, the correlation coefficient calculation unit 37a in the evaluation item calculation unit 37 calculates the correlation coefficient "r" by using the data of the signal track.

In subsequent Step S105, processing of estimating to which of gesture motions in the horizontal direction, gesture motions in the vertical direction and turning motions the gesture motion detected at this time belongs by the motion determination unit 38.

In Step S305, the motion determination unit 38 takes the correlation coefficient "r" calculated in Step S104. Then, to which range of r>0.5, r<−0.5 and −0.5≦r≦0.5 the correlation coefficient "r" belongs is determined.

As described above, in the determination between the horizontal direction and the vertical direction, the gesture motion is determined to be one in the horizontal direction when the correlation coefficient "r" is a positive value, and the gesture motion is determined to be one in the vertical direction when the correlation coefficient "r" is a negative value in principle.

However, in the case of adding turning motions as gesture motions to be determined, a fixed value is given, and when an absolute value of the correlation coefficient "r" is less than the fixed value, the gesture motion is determined to be the turning motion and when the absolute value of the correlation coefficient "r" is more than the fixed value, it is determined to be gesture motions in horizontal/vertical directions.

"+0.5", "−0.5" which are threshold values to be compared with the correlation coefficient "r" in Step S105 correspond to the fixed value for determining to which of gesture motions in horizontal/vertical directions and turning motions the gesture motion belongs. The specific values "+0.5", "−0.5" as threshold values are just an example, and they should be approximately altered in view of actual situations. It is also preferable that different values are set as a positive threshold value and a negative threshold value.

In this case, when the correlation coefficient "r" is more than 0.5, the gesture motion is determined to be one in the horizontal direction. Accordingly, when it is determined in Step S105 that the correlation coefficient "r" is more than 0.5, the motion determination unit 38 outputs a recognition result that the gesture motion is one in the horizontal direction in Step S106 first. Next, as processing corresponding to the recognition result, procedures after subsequent Step S107 are executed to thereby further execute processing of determining whether the gesture motion is the rightward motion or the leftward motion.

In Step S107, the motion determination unit 38 calculates the barycenter G (gx, gy) concerning the signal track by the barycenter calculation unit 37b. Next, in Step S108, the motion determination unit 38 takes the barycenter G calculated in Step S107 and determines a quadrant in which coordinates of the barycenter G (gx, gy) exist.

In Step S108, the motion determination unit 38 outputs a determination result that the gesture motion is the rightward motion when it is determined that the coordinates exist in the first quadrant. When it is determined that coordinates exist in the third quadrant, a determination result that the gesture motion is the leftward motion is outputted.

In Step S108, when it is determined that the coordinates exist in quadrants other than the first quadrant and the third quadrant (the second quadrant, the fourth quadrant), the process proceeds to Step S122 here, and a determination result that a significant gesture motion has not been performed is outputted.

For example, it is preferable to apply an algorithm of making correction so that the barycenter G positioned at the second quadrant or the fourth quadrant is positioned at a quadrant which is more suitable in the first quadrant and the third quadrant in accordance with rules and calculation previously fixed, and the determination result of the rightward motion or the leftward motion is outputted in accordance with the result.

When it is determined that the correlation coefficient "r" is less than −0.5 in Step S105, the motion determination unit 38 outputs a recognition result that the gesture motion is one in the vertical direction first as shown in Step S111. Then, procedures after Step S112 are executed as processing corresponding to the recognition result to thereby further execute processing of determining to which motion of the upper motion and the lower motion the gesture motion correspond.

In Step S112, the motion determination unit 38 calculates the barycenter G (gx, gy) concerning the signal track by the barycenter calculation unit 37b and determines a quadrant in which coordinates of the barycenter G (gx, gy) exist in subsequent Step S113.

In Step S113, the motion determination unit 38 outputs a determination result that the gesture motion is the downward motion when it is determined that the coordinates exist in the second quadrant. When it is determined that coordinates exist in the fourth quadrant, a determination result that the gesture motion is the upward motion is outputted.

When it is determined that the coordinates exist in quadrants other than the second quadrant and the fourth quadrant (the first quadrant, the third quadrant), it is determined that a determination result that a significant gesture operation has not been performed in Step S122. Also in this case, it is preferable that a correction is made so that the barycenter G is positioned at the second quadrant or the fourth quadrant, and that the determination result of the upward motion or the downward motion is outputted in the same manner as the determination of gesture motions in the horizontal direction.

When it is determined in Step S105 that the correlation coefficient "r" is equal to or more than −0.5 as well as equal to or less than 0.5, determination processing by Step S116 is executed first. In Step S116, whether the number of recording samples of sensor signals is more than the previously set threshold or not is determined.

As has been described above, when the correlation coefficient "r" is equal to or more than −0.5 as well as equal to or less than 0.5, the gesture motion can be determined to belong to turning motions.

However, there is a probability that the absolute value of the correlation coefficient "r" is equal to or less than the fixed value also at the time of detecting motions other than turning motions. For example, in the case of the motion in which the object is moved at an angle significantly inclined with respect to the horizontal direction or the vertical direction though it is a linear movement, crosstalk occurs between detection axes orthogonal to each other and the absolute value of the correlation coefficient "r" is reduced. As a result, there is a probability that the absolute value of the correlation coefficient "r" becomes equal to or less than the fixed value.

The processing of Step S116 is for discriminating whether the detected motion belongs to the turning motions or other motions when the correlation coefficient "r" is determined to be equal to or more than −0.5 as well as equal to or less than 0.5 in consideration of the above.

The number of recording samples of sensor signals N indicates the number of sample data recorded by the first sensor signal recording unit 31 and the second sensor signal recording unit 32 so as to correspond to the gesture motion period detected by the gesture detection unit 33. That is, the number of recording samples N is the gesture motion period detected by the gesture detection unit 33, which indicates the time length during which the motion has been continuously detected.

The gesture motions in the horizontal/vertical directions are linear movement, therefore, a period of time detected as the gesture motion period is short. On the other hand, turning motions have movement tracks describing an arc, therefore, a period of time will be long accordingly. That is, an appropriately long period of time is necessary for the gesture motion period as the turning motion.

Therefore, for the correspondence with Step S116, the threshold value is determined based on the number of samples obtained corresponding to the common, average time length as the gesture motion period obtained when performing the turning operation. As the processing of Step S116, when the number of recording samples N is more than the threshold value, a determination result that the gesture motion is the turning motion is obtained in Step S117. On the other hand, when a negative determination result that the number of recording samples N of less than the threshold, the process proceeds to Step S122, and the determination result that the significant motion has not been performed is outputted.

In Step S118, the motion determination unit 38 calculates the turning direction of the signal track. That is, the motion determination unit 38 calculates the sum value "p" of z-components of cross products of the signal track by executing calculation by the previous [Expression 3]. Positive/negative of the sum value "p" of z-components of cross products indicates the turning direction.

In Step S119, the motion determination unit 38 determines the whole trend of the turning direction of the signal track based on the sum value "p" of cross products calculated in Step S118. That is, when the sum value "p" of z-components of cross products is a positive value, it is determined that the whole trend of the turning direction of the signal track is left-turning, and when the sum value "p" of z-components of cross products is a negative value, it is determined that the whole trend of the turning direction of the signal track is right-turning.

When the motion determination unit 38 determines that the turning direction is right-turning in Step S119, the unit outputs a determination result of right-turning motion in Step S120. When the motion determination unit 38 determines that the turning direction is left-turning, the unit outputs a determination result of left-turning motion in Step S121.

8. Modification Example of Phase Plane Mapping Processing

In the phase plane mapping processing explained above with reference to FIG. 11A and FIG. 11B, coordinates are plotted on the phase plane by using values of the normalized sensor signals NOM_S1, the normalized sensor signals NOM_S2 at the same sampling timing. That is, when i-th sample values of N-pieces of recording samples with respect to the normalized sensor signals NOM_S1, the normalized sensor signals NOM_S2 are xi, yi, coordinates (xi, yi) ($1 \leq i \leq N$) are plotted on the phase plane sequentially. In this case, values of the normalized sensor signals NOM_S1, the normalized sensor signals NOM_S2 are used as coordinates values of coordinates to be plotted as they are.

On the other hand, in a modification example of the phase plane mapping processing, values obtained by exponentiation of sample values of the original normalized sensor signals NOM_S1, NOM_S2 are used as values as the x-axis coordinate and the y-axis coordinate to be plotted on the phase plane. In this case, an odd number of 3 or more is used as an exponent "n" of exponentiation.

That is, as the normalization processing, when i-th sample values in N-pieces of recording samples with respect to the normalized sensor signals NOM_S1, the normalized sensor signals NOM_S2 are xi, yi, coordinates $(xi\hat{\ }n, yi\hat{\ }n):(1 \leq i \leq N,$ n is an odd number of 3 or more) are plotted.

First, when the normalized sensor signals NOM_S1, the normalized sensor signals NOM_S2 are exponentiated, a value having smaller absolute value is converted into a smaller value. This means that the higher the absolute value is, the higher weighting is given. Then, the trend of comprehensive shape of the signal track formed on the phase plane is emphasized as compared with the case in which coordinates (xi, yi) are plotted. For example, the comprehensive shape of the signal track can be seen as the ellipse E in the case of gesture motions in the horizontal/vertical directions as described above. The shape of the ellipse E in this case becomes elongated, in which the ratio of the major axis and the minor axis is increased.

However, when an even number is used as the exponent "n" of exponentiation, in the case that the original sample value (xi, yi) is a negative number, the exponentiated value is inverted to a positive value. Accordingly, the odd number is used as the exponent "n" of exponentiation to allow the sign of positive/negative of the original sample value (xi, yi) to remain as it is without being inverted.

The whole shape of the signal track formed by performing the phase plane mapping by coordinates $(xi\hat{\ }n, yi\hat{\ }n)$ is emphasized and can be elongated. As the correlation coefficient "r" calculated by using the signal track formed in this manner, an extreme absolute value more than the fixed value can be obtained corresponding to gesture motions, for example, in the horizontal/vertical directions. Also, an extreme value less than the fixed value can be obtained corresponding to turning motions. That is, it is possible to increase accuracy when determining to which of gesture motions in the horizontal direction, the vertical direction and the turning direction the gesture motion belongs.

Also when coordinates of the barycenter G is calculated based on the signal track formed by the coordinates $(xi\hat{\ }n, yi\hat{\ }n)$, the calculated coordinates can be far from the origin and definite, though they are positioned at an appropriate quadrant in accordance with the detected gesture motion. That is, concerning gesture motions in the horizontal direction, the determination accuracy for the rightward motion and the leftward motion is improved. Also concerning gesture motions in the vertical direction, the determination accuracy for the upward motion and the downward motion can be improved.

The coordinate (gx, gy) of barycenter G can be calculated based on the signal track formed by the coordinates $(xi\hat{\ }n, yi\hat{\ }n)$, for example, by the following calculation.

$$g_x = \sum_{i=1}^{N} x_i^3 \ , \ g_y = \sum_{i=1}^{N} y_i^3$$

9. Modification Example Concerning the Arrangement Example of the One-Dimensional Sensor The arrangement example of two pairs of infrared detecting elements 51A-1, 51B-1 and infrared detecting elements 51A-2, 51B-2 which detect one-dimensional movement in the one-dimensional sensors 40-1, 40-2 included in the sensor unit 5 is not limited to one shown in FIG. 8A and FIG. 8B. That is to say, it is preferable to apply other configurations as long as a pair of infrared detecting elements 51A-1, 51B-1 and a pair of infrared detecting elements 51A-2, 51B-2 can output signals Sa, Sb corresponding to the movement with time difference with respect to both linear gesture motions along two axes by giving, for example, an angle of 45 degrees to the detection axes with respect to respective movement directions of the linear gesture motions along two axes to be recognized/determined.

Accordingly, as a modification example of arrangement of one-dimensional sensors, other arrangement examples of the infrared detecting elements 51A-1, 51B-1 and the infrared detecting elements 51A-2, 51B-2 will be shown with reference to FIG. 21A, FIG. 21B and FIG. 22A, FIG. 22B.

Figure 21A:
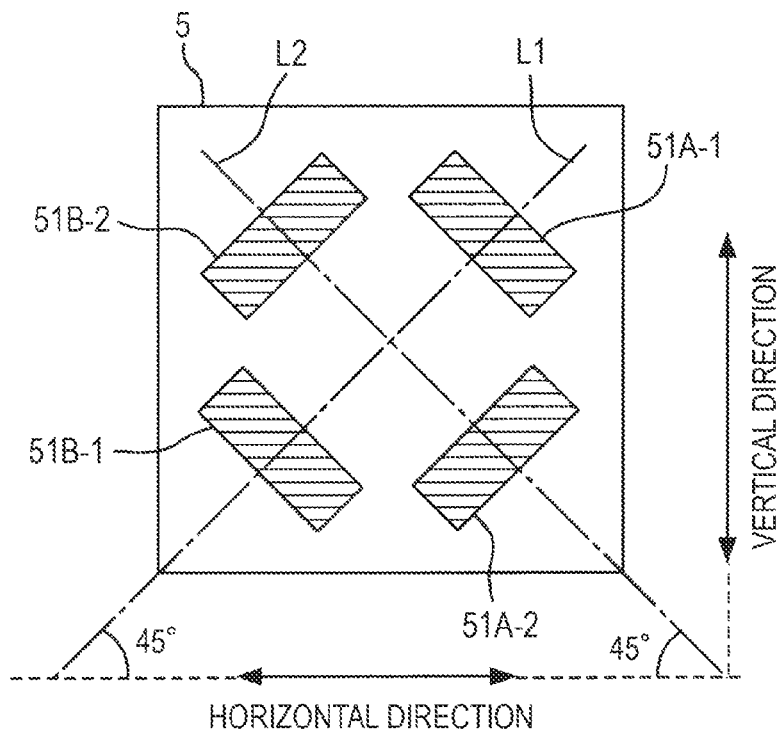
FIG. 21A and FIG. 21B are views showing a modification example of the arrangement example of one-dimensional sensors (infrared detecting elements) according to an embodiment.
Figure 21B:
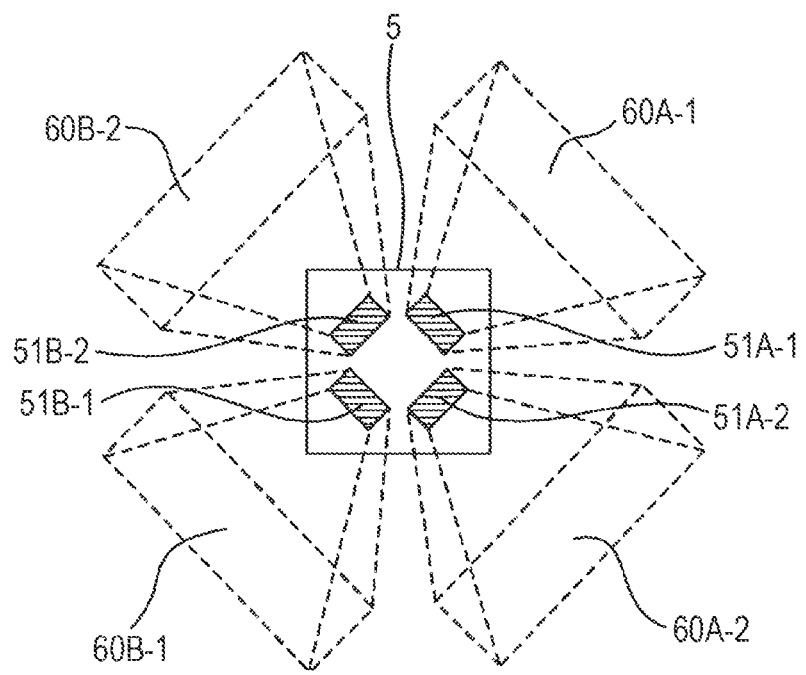

In the modification example shown in FIG. 21A and FIG. 21B, an example in which the infrared detecting elements 51A-1, 51B-1 and the infrared detecting elements 51A-2, 51B-2 are mounted on one component/device as the sensor unit 5 is shown. For example, a device including the pair of infrared detecting elements 51A, 51B such as the one-dimensional sensors 40-1, 40-2 shown in FIG. 8A and FIG. 8B is often provided as a general-purpose pyroelectric sensor component. However, in the case that linear gesture motions along two axes orthogonal to each other are basically detected such as in the embodiment, it is also preferable to configure the device as one pyroelectric sensor component including two pairs of infrared detecting elements 51A-1, 51B-1 and infrared detecting elements 51A-2, 51B-2.

As the arrangement in FIG. 21A, first, the detection axis L1 corresponding to the infrared detecting elements 51A-1, 51B-1 and the detection axis L2 corresponding to the infrared detecting elements 51A-2, 51B-2 are in the same angle relation as FIG. 8A with respect to horizontal/vertical directions.

On that condition, the infrared detecting elements 51A-1, 51B-1 are arranged at a position passing through the detection axis L1 and the infrared detecting elements 51A-2, 51B-2 are arranged at a position passing through the detection axis L2 by the shown example.

The space detection areas 60A-1, 60B-1 and the space detection areas 60A-2, 60B-2 formed in accordance with the arrangement of the infrared detecting elements 51A-1, 51B-1 and the infrared detecting elements 51A-2, 51B-2 according to the configuration of FIG. 21A are shown in FIG. 21B.

Next, a modification example shown in FIG. 22A and FIG. 22B will be explained.

Figure 22A:
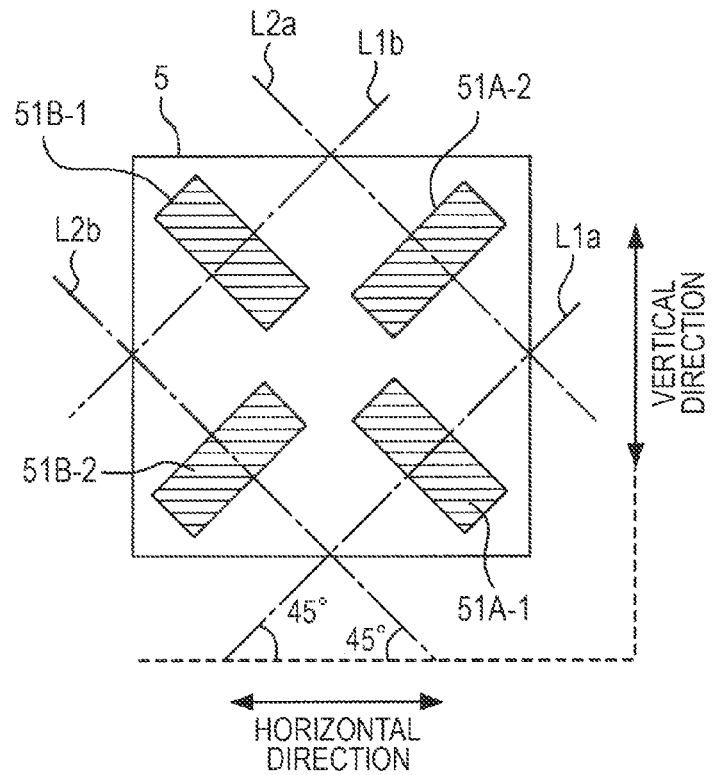
FIG. 22A and FIG. 22B are views showing a modification example of the arrangement example of one-dimensional sensors (infrared detecting elements) according to an embodiment.

In this case, the detection axis L1 is set to be divided into two parallel detection axes L1a, L1b at fixed distance therebetween as shown in FIG. 22A. The detection axes L1a, L1b sets the same angle as the detection axis L1 of FIG. 8A with respect to the horizontal/vertical directions. In this case, the positional relationship in which the detection axis L1a is at the lower side and the detection axis L1b is at the upper side is applied. Similarly, the detection axis L2 is also set to be divided into two parallel detection axes L2a, L2b at fixed distance therebetween on condition that the same angle as the detection axis L2 of FIG. 8A is set with respect to the horizontal/vertical directions. In this case, the positional relationship in which the detection axis L2b is at the lower side and the detection axis L2a is at the upper side is applied.

On the above condition, the infrared detecting element 51A-1 is arranged on the detection axis L1a, and the infrared detecting element 51B-1 is arranged on the detection axis L1b. Also, the infrared detecting element 51A-2 is arranged on the detection axis L2a, and the infrared detecting element 51B-2 is arranged on the detection axis L2b.

Figure 22B:
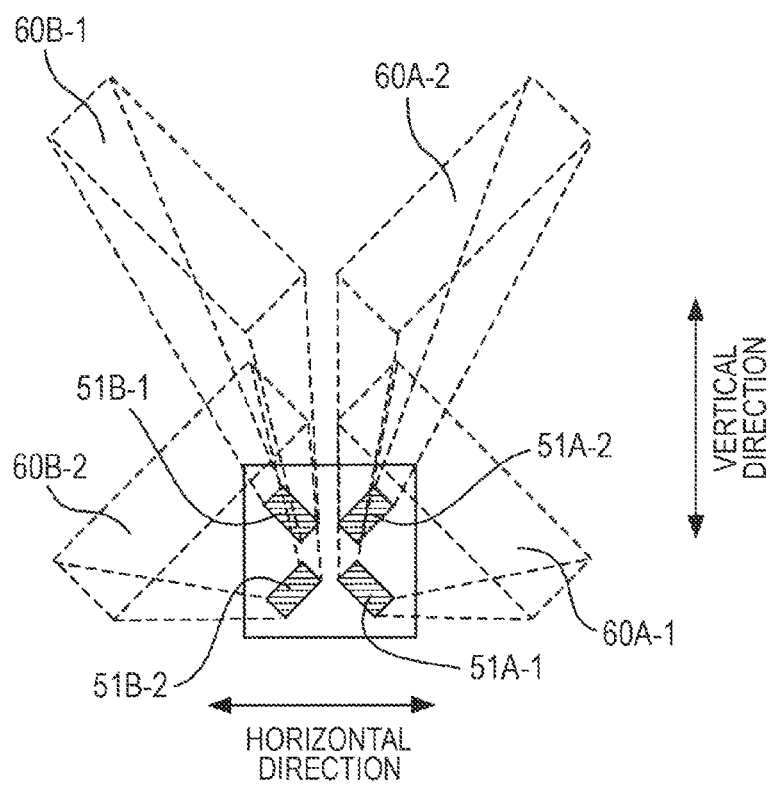

The space detection areas 60A-1, 60B-1, the space detection areas 60A-2, 60B-2 formed in accordance with the arrangement of the infrared detecting element 51A-1, 51B-1 and the infrared detecting element 51A-2, 51B-2 are shown in FIG. 22B.

Also according to any of arrangement examples shown in FIG. 21A, FIG. 21B and FIG. 22A, FIG. 22B, one pair of infrared detecting elements 51A-1, 51B-1 can detect movements with time difference also with respect to movements of any of horizontal/vertical directions as in the manner shown in FIGS. 8A and 8B.

Also, the other pair of infrared detecting elements 51A-2, 51B-2 can detect movement with time difference also with respect to movements in any of horizontal/vertical directions.

The order of detecting linear movements in the horizontal/vertical directions by the infrared detecting elements 51A-1, 51B-1 and the infrared detecting elements 51A-2, 51B-2 is the same as FIG. 8A and FIG. 8B.

In the previous explanation, the gesture motion determination unit 18 of FIG. 17 performs software processing realized by executing a program by the CPU as the control unit 11. However, the signal processing as the gesture motion determination unit 18 can be configured by a DSP (Digital Signal Processor). That is, programs and instructions for executing signal processing as the gesture motion determination unit 18 are allowed to be stored in the DSP.

It is also conceivable that signal processing as the gesture motion determination unit 18 is configured by hardware.

It is further conceivable that programs executed by the CPU as the control unit 11 are stored by being written in, for example, a flash memory and a ROM, and that programs are stored in a removal storage medium and installed (including update) from the removal storage medium to be stored in the flash memory and so on. It is also conceivable that programs can be installed under control by another host device by allowing programs to go through a given data interface. Further, it is conceivable that programs are stored in a storage device in a server and the like on the network to have, for example, a device network function executing gesture recognition, which can be installed by acquiring the function by downloading from the server.

In the previous explanation, the angle of 45 degrees with respect to the horizontal/vertical directions is given to the detection axes L1, L2 of the one-dimensional sensors 40-1, 40-2. This is because the linear gesture motions in which two axes are orthogonal defined in the embodiment are along the horizontal direction (first direction) corresponding to leftward and rightward motions and along the vertical direction (second direction) corresponding to upward and downward motions.

For example, when the linear gesture motions in which two axes are orthogonal are defined as motions along directions at angles of 45 degrees with respect to horizontal/vertical directions respectively, the one-dimensional sensors 40-1, 40-2 should be arranged so that the detection axes L1, L2 correspond to horizontal/vertical directions.

In the embodiment, the linear gesture motions along two axes are defined as motions along directions orthogonal to each other as the most possible example, however, it is not inevitably necessary that directions are not orthogonal. That is, the angle at which respective axes of the linear gesture motions cross each other may be angles other than 90 degrees.

In the embodiment, even when the angle at which respective axes of linear gesture motions cross each other is an angle other than 90 degrees, it is possible to suitably recognize the gesture motion in directions of respective axes if necessary detection time difference is obtained at the pair of detecting elements.

In the above description, the case in which the dual-type pyroelectric sensor is applied as the one-dimensional sensor 40 has been cited. However, other systems other than the system using pyroelectric effects can be cited as the sensor system to be applied as the one-dimensional sensor. It is possible to apply one-dimensional sensors configured based on these systems.

In the above explanation, the configuration for recognizing/determining gestures in the embodiment is applied to the photo frame display device, however, it is just an example. The configuration of gesture recognition of the embodiment can be variously applied to other various types of devices.

The present application contains subject matter related to that disclosed in Japanese Priority Patent Applications JP 2009-030136 and JP 2009-120193 filed in the Japan Patent Office on Feb. 12, 2009 and May 18, 2009, respectively, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A gesture recognition apparatus comprising:
   first and second one-dimensional sensor means for detecting movement corresponding to a motion of an object in a one-dimensional direction along one detection axis and outputting a signal corresponding to the detected movement, in which detection axes are arranged along different directions with respect to a first direction and a second direction which are directions of linear motions of the object defined as a recognition target;

a normalization processing means for executing processing of normalization by converting amplitude values of respective first and second signals outputted from the first and second one-dimensional sensor means into values represented by ratios with respect to peak values;

a phase plane mapping processing means for forming a signal track corresponding to the first and second signals in time series by plotting coordinates on a phase plane by using x-coordinate values based on values of the normalized first signals and y-coordinate values based on values of the normalized second signals at respective same timings;

a correlation coefficient calculation means for calculating a correlation coefficient with respect to the first and second signals by using coordinate values forming the signal track; and a motion determination means for determining whether the detected movement is a motion in the first direction or a motion in the second direction at least based on whether a value of the correlation coefficient is positive or negative.

2. The gesture recognition apparatus according to claim 1, further comprising:

a barycenter calculation means for calculating coordinates of a barycenter of the signal track on the phase plane, wherein the motion determination means determines whether the motion is a positive-direction motion or a reverse-direction motion in the first direction based on the calculated coordinates of the barycenter when the correlation coefficient corresponds to a determination result that the motion is along the first direction and determines whether the motion is a positive-direction motion or a reverse-direction motion in the second direction based on the calculated coordinates of the barycenter when the correlation coefficient corresponds to a determination result that the motion is along the second direction.

3. The gesture recognition apparatus according to claim 1 or 2, further comprising:

a plot-turning direction recognition means for recognizing a plot-turning direction which is a turning direction when coordinates of the signal track are plotted in time series under a condition that a turning motion in which an object is moved in an approximately circular manner is fixed as a motion of the object to be recognized, wherein the motion determination means determines whether the motion is a right-turning motion or a left-turning motion based on the recognized plot-turning direction when an absolute value of the correlation coefficient is equal to or less than a fixed value corresponding to a determination result that the detected movement of the object is the turning motion.

4. The gesture recognition apparatus according to claim 3, wherein the plot-turning direction recognition means recognizes the plot-turning direction based on positive/negative of a sum value after the sum value of z-components of cross products at plotted respective coordinates.

5. The gesture recognition apparatus according to claim 4, wherein the motion determination means obtains the determination result that the detected movement of the object is the turning motion when the absolute value of the correlation coefficient is equal to or less than the fixed value and a time length of a period during which the movement of the object has been detected is equal to or more than a second fixed value.

6. The gesture recognition apparatus according to claim 5, wherein the phase plane mapping processing means uses a value obtained by exponentiating a value of the normalized first signal by an odd exponent as the x-coordinate value based on the value of the normalized first signal, and uses a value obtained by exponentiating a value of the normalized second signal by the odd exponent as the y-coordinate value based on the value of the normalized second signal.

7. A gesture recognition method comprising:

performing processing of normalization by converting amplitude values of respective first and second signals outputted from first and second one-dimensional sensors into values represented by ratios with respect to peak values, in which each of the first and second one-dimensional sensors detects movement corresponding to a motion of an object in a one-dimensional direction along one detection axis and outputs a signal corresponding to the detected movement, in which detection axes are arranged along different directions with respect to a first direction and a second direction which are directions of linear motions of the object defined as a recognition target;

forming a signal track corresponding to the first and second signals in time series by plotting coordinates on a phase plane by using x-coordinate values based on values of the normalized first signals and y-coordinate values based on values of the normalized second signals at respective same timings;

calculating a correlation coefficient with respect to the first and second signals by using coordinate values forming the signal track; and determining, using at least one processor, whether the detected movement is a motion in the first direction or a motion in the second direction at least based on whether a value of the correlation coefficient is positive or negative.

8. At least one non-transitory computer-readable medium having encoded thereon computer-executable instructions that, when executed by at least one computer, cause the at least one computer to carry out a method comprising:

performing processing of normalization by converting amplitude values of respective first and second signals outputted from first and second one-dimensional sensors into values represented by ratios with respect to peak values, in which each of the first and second one-dimensional sensors detects movement corresponding to a motion of an object in a one-dimensional direction along one detection axis and outputs a signal corresponding to the detected movement, in which detection axes are arranged along different directions with respect to a first direction and a second direction which are directions of linear motions of the object defined as a recognition target;

forming a signal track corresponding to the first and second signals in time series by plotting coordinates on a phase plane by using x-coordinate values based on values of the normalized first signals and y-coordinate values based on values of the normalized second signals at respective same timings;

calculating a correlation coefficient with respect to the first and second signals by using coordinate values forming the signal track; and determining whether the detected movement is a motion in the first direction or a motion in the second direction at least based on whether a value of the correlation coefficient is positive or negative.

9. A gesture recognition apparatus comprising:

first and second one-dimensional sensor units configured to detect movement corresponding to a motion of an object in a one-dimensional direction along one detection axis and output a signal corresponding to the detected movement, in which detection axes are arranged along different directions with respect to a first direction and a second direction which are directions of linear motions of the object defined as a recognition target;

a normalization processing unit configured to execute processing of normalization by converting amplitude values of respective first and second signals outputted from the first and second one-dimensional sensor units into values represented by ratios with respect to peak values;

a phase plane mapping processing unit configured to form a signal track corresponding to the first and second signals in time series by plotting coordinates on a phase plane by using x-coordinate values based on values of the normalized first signals and y-coordinate values based on values of the normalized second signals at respective same timings;

a correlation coefficient calculation unit configured to calculate a correlation coefficient with respect to the first and second signals by using coordinate values forming the signal track; and a motion determination unit configured to determine whether the detected movement is a motion in the first direction or a motion in the second direction at least based on whether a value of the correlation coefficient is positive or negative.

10. The gesture recognition apparatus according to claim 1, wherein the phase plane mapping processing means uses a value obtained by exponentiating a value of the normalized first signal by an odd exponent as the x-coordinate value based on the value of the normalized first signal, and uses a value obtained by exponentiating a value of the normalized second signal by the odd exponent as the y-coordinate value based on the value of the normalized second signal.

* * * * *